(12) United States Patent
Sakaue et al.

(10) Patent No.: US 7,697,184 B2
(45) Date of Patent: Apr. 13, 2010

(54) OPTICAL SCANNING DEVICE AND IMAGE FORMING APPARATUS

(75) Inventors: Yoshinobu Sakaue, Tokyo (JP); Kazunori Bannai, Kanagawa (JP); Iwao Matsumae, Tokyo (JP); Noboru Kusunose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 288 days.

(21) Appl. No.: 11/822,820

(22) Filed: Jul. 10, 2007

(65) Prior Publication Data
US 2008/0024851 A1   Jan. 31, 2008

(30) Foreign Application Priority Data
Jul. 31, 2006   (JP) ............................. 2006-208507

(51) Int. Cl.
*G02B 26/08*   (2006.01)
(52) U.S. Cl. .................................................. 359/212.1
(58) Field of Classification Search ............. 359/204.1, 359/212; 347/234, 235, 241, 243; 250/234–236
See application file for complete search history.

(56) References Cited
U.S. PATENT DOCUMENTS
6,404,448 B1 * 6/2002 Toda ........................... 347/234

2005/0194730 A1   9/2005  Nishida et al.
2006/0050104 A1   3/2006  Sakakitani
2006/0181569 A1   8/2006  Kawashima et al.

FOREIGN PATENT DOCUMENTS
| JP | 2000-180747 | 6/2000 |
| JP | 2000-235290 A | 8/2000 |
| JP | 2004-191847 A | 7/2004 |
| JP | 2004-287380 A | 10/2004 |

* cited by examiner

*Primary Examiner*—Euncha P Cherry
(74) *Attorney, Agent, or Firm*—Harness, Dickey & Pierce, P.L.C.

(57) ABSTRACT

An optical scanning device includes a polygon mirror, a beam detector, a correcting unit, and a controller. The polygon mirror deflects and scans a light beam in a main scanning direction on a surface of an image carrier. The beam detector detects a beam position of the deflected light beam in a sub-scanning direction. The correcting unit calculates a correction amount of out-of-color registration based on the beam position, and corrects out-of-color registration in the sub-scanning direction based on the correction amount. The controller controls, during correction of out-of-color registration, a deflection speed of the deflector to be less than a deflection speed for writing a latent image on the surface of the image carrier.

18 Claims, 20 Drawing Sheets

ROTATION

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document, 2006-208507 filed in Japan on Jul. 31, 2006.

BACKGROUND OF THE INVENTION

1. Field of the Invention

The present invention relates to an optical scanning device, and an image forming apparatus.

2. Description of the Related Art

Tandem color image forming apparatuses have been known, which form images (visible images) of different colors on a plurality of image carriers and superimpose them one on top of another to form a color image. This image forming apparatus irradiates a write beam, i.e., a light beam corresponding to image information, onto the respective image carriers and scans these beams to form a latent image on the image carriers, and develops the latent images. An optical scanning device that irradiates and scans the write beam generally includes a polygon mirror as a deflector that deflects and scans the write beam from a light source, and a plurality of optical elements (lenses and the like) for imaging the write beam deflected and scanned by the polygon mirror on surfaces of the image carriers. In such an optical scanning device, position and angle change slightly between the respective optical elements due to several reasons including a field curvature characteristic of the optical element, a distortion of a housing of the optical scanning device, deformation of components constituting the optical scanning device due to heat generated by a polygon motor, and a distortion at the time of fitting the image carriers. If a change in position and angle occurs between the respective optical elements, a scanning position of the write beam onto the image carriers changes. Besides, a curvature or inclination of a scanning line by the write beam occurs on the surfaces of the image carriers. As a result, a relative deviation of the scanning position of the write beam, and of the curvature and inclination of the scanning line appear as out-of-color registration. Particularly, out-of-color registration due to the relative deviation of the scanning position in a sub-scanning direction between respective image carriers has been a problem.

In conventional technologies, a pattern image (a registration mark image) is formed for detecting the relative deviation of the scanning position in the sub-scanning direction between respective image carriers, and thereafter, the position is detected by a sensor. Thus, the sub-scanning position is corrected based on the detection result (registration correction).

In the registration correction, however, the pattern image is formed on a transfer medium such as the image carrier and an intermediate transfer belt. If there is a defect or a foreign matter adheres on the image carrier or the intermediate transfer belt, the pattern image may not be accurately formed. As a result, detection cannot be performed, or even if detection is possible, the correction result may not be appropriate. In addition, a sensor that detects the pattern image is arranged near the image carrier or the intermediate transfer belt. Accordingly, the sensor may be stained due to toner scattered from the image carrier or the intermediate transfer belt. In such a case, the pattern image cannot be accurately detected. Furthermore, downtime is required at the time of forming or detecting the pattern image, during which an image forming operation cannot be performed.

Japanese Patent Application Laid-open Nos. 2004-287380, 2000-235290, and Japanese Patent No. 3087748 discloses an image forming apparatus including a beam detector that detects the position of the write beam, in which out-of-color registration is corrected based on the detection result of the beam detector. Thus, by directly detecting the scanning position of the write beam, a pattern image for position detection need not be formed. As a result, such a situation can be reduced that detection cannot be performed, or even if detection is possible, the correction result may not be appropriate. Further, because the pattern image is not formed, the downtime can be reduced at the time of correcting out-of-color registration.

However, when out-of-color registration is corrected by detecting the position of the write beam, the correction is started after a rotation speed (deflection speed) of the polygon mirror reaches that for writing a latent image on the image carriers, and the position of the write beam is detected by the beam detector. As a result, the time for detecting the write beam by the beam detector is required. Therefore, the time until starting correction of out-of-color registration is long.

SUMMARY OF THE INVENTION

It is an object of the present invention to at least partially solve the problems in the conventional technology.

According to an aspect of the present invention, an optical scanning device includes a light emitting unit that emits a light beam, a deflector that deflects and scans the light beam in a main scanning direction on a surface of an image carrier, a beam detector that detects a beam position of the light beam deflected by the deflector in a sub-scanning direction, a correcting unit that calculates a correction amount of out-of-color registration based on the beam position, and shifts the beam position to a specified position on the surface of the image carrier based on the correction amount to correct out-of-color registration in the sub-scanning direction, and a controller that controls, while the beam detector detects the beam position for correction of out-of-color registration, a deflection speed of the deflector to be less than a deflection speed for writing a latent image on the surface of the image carrier.

According to another aspect of the present invention, an image forming apparatus includes an optical scanning device that includes a light emitting unit that emits a light beam, a deflector that deflects and scans the light beam in a main scanning direction on a surface of an image carrier, a beam detector that detects a beam position of the light beam deflected by the deflector in a sub-scanning direction, a correcting unit that calculates a correction amount of out-of-color registration based on the beam position, and shifts the beam position to a specified position on the surface of the image carrier based on the correction amount to correct out-of-color registration in the sub-scanning direction, and a controller that controls, while the beam detector detects the beam position for correction of out-of-color registration, a deflection speed of the deflector to be less than a deflection speed for writing a latent image on the surface of the image carrier.

The above and other objects, features, advantages and technical and industrial significance of this invention will be better understood by reading the following detailed descrip-

DETAILED DESCRIPTION OF THE PREFERRED EMBODIMENTS

Exemplary embodiments of the present invention are explained in detail below with reference to the accompanying drawings.

Figure 1:
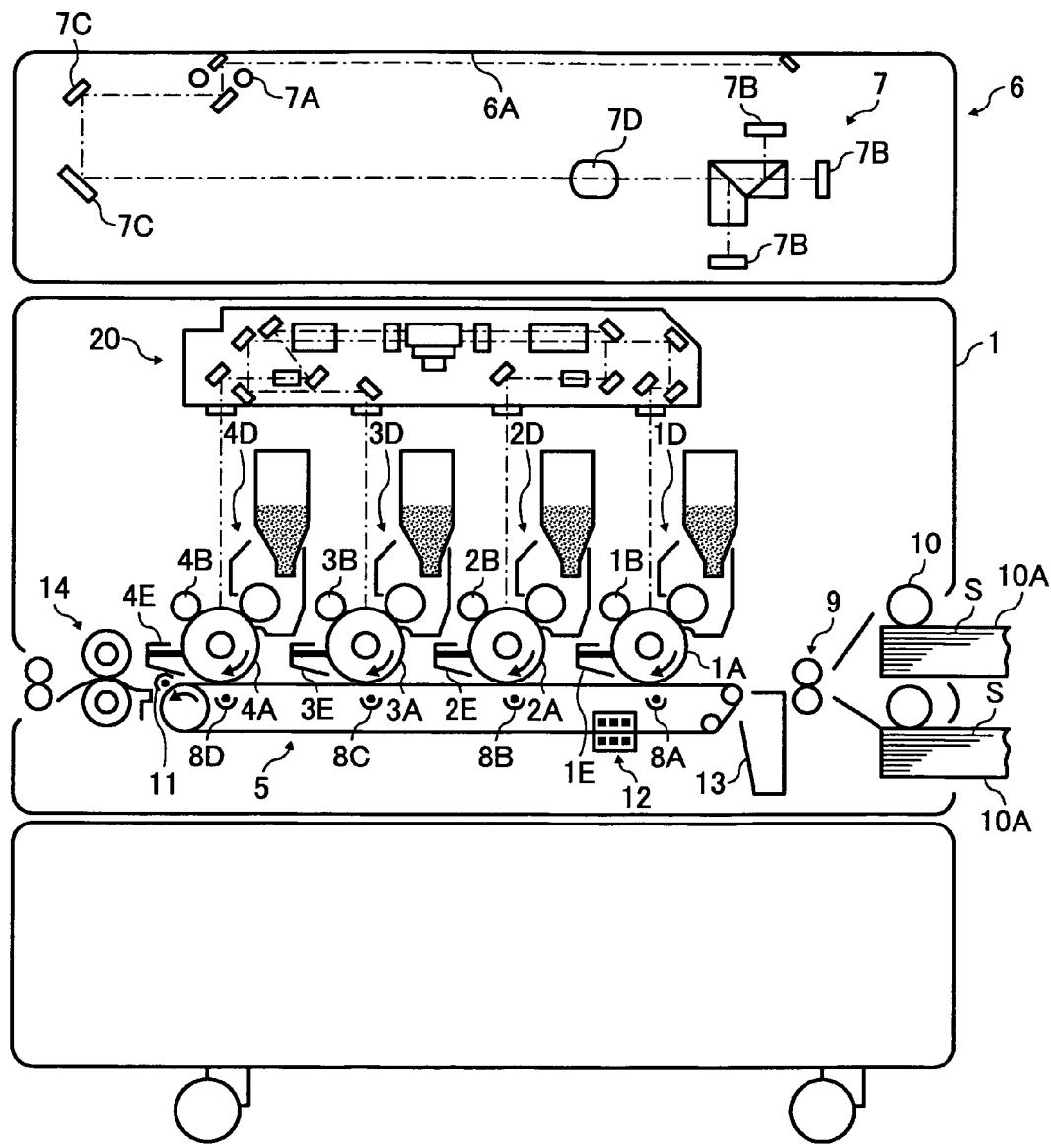
FIG. 1 is a side view of an image forming apparatus according to an embodiment of the present invention.

FIG. 1 is a side view of an image forming apparatus 1 capable of forming a color image. While the image forming apparatus 1 is described as a copier, it can be other image forming apparatuses such as a facsimile machine, a printer, and a multifunction product with functions of a copier, a printer, and the like. When being used as a printer or a facsimile machine, the image forming apparatus 1 performs an image forming process based on an image signal corresponding to image information received from an external device.

The image forming apparatus 1 can perform the image forming process on an OverHead Projector (OHP) sheet, a cardboard such as a card and a postcard, and an envelope as well as a regular sheet generally used for copying, as a recording medium S.

The image forming apparatus 1 is of tandem type, and includes photosensitive drums 1A, 2A, 3A, and 4A as image carriers for forming color images of different colors: yellow, cyan, magenta, and black, which are arranged in parallel. Visible images of a different color formed on the respective photosensitive drums 1A, 2A, 3A, and 4A are superimposed and transferred onto a transfer sheet S, which is a recording medium carried by a movable transfer belt 5, while facing the respective photosensitive drums 1A, 2A, 3A, and 4A.

The respective photosensitive drums 1A, 2A, 3A, and 4A are of basically the same configuration, and thus but one of them, for example, the photosensitive drum 1A is described with surroundings thereof.

The following devices are arranged in the periphery of the photosensitive drum 1A for performing the image forming process along a rotation direction shown by arrow. That is, a charger 1B that uses a configuration of a corotron or scorotron, an optical scanning device 20 using laser beams from a laser light source, a developing device 1D and a cleaning device 1E.

Arrangement of the developing devices 1D to 4D is such that toners of yellow, cyan, magenta, and black can be sequentially supplied from the right in extended parts of the transfer belt 5 in FIG. 1. A roller is used for the charger 1B in an example shown in FIG. 1; however, the charger 1B is not limited to a contact type using the roller, and a corona discharge type using a discharge wire can be used.

In the image forming apparatus 1, a document reader 6 is arranged above an image forming unit in which the charger 1B, the optical scanning device 20, the developing device 1D and the cleaning device 1E are arranged. The image information obtained by reading a document placed on an original table 6A by a reader 7 is output to an image processing controller (not shown) so that write information relative to the optical scanning device 20 can be obtained.

The reader 7 includes a light source 7A for scanning the document placed on the original table 6A, a plurality of reflecting mirrors 7C for imaging light reflected from the document to a charge coupled device (CCD) 7B provided corresponding to each color, and an imaging lens 7D. The image information corresponding to light intensity for each color is output from the respective CCD 7B to the image processing controller.

The transfer belt 5 has a thickness of 100 micrometers and is made of a dielectric such as a polyester film spanned over a plurality of rollers. One of the extended parts faces the respective photosensitive drums 1A to 4A, and transfer devices 8A, 8B, 8C, and 8D are arranged to face the photosensitive drums 1A to 4A, respectively. The thickness of the transfer belt 5 has a manufacturing error of ±10 micrometers, and as described below, misregistration can occur at the time of superimposing toner images of the respective colors. However, this can be corrected mainly by a misregistration write-start position-correcting unit 100, described later.

The transfer sheet S sent out from a sheet feeding cassette 10A in a sheet feeding device 10 is fed to the transfer belt 5 via a registration roller pair 9, electrostatically attracted to the transfer belt 5 by corona discharge from the transfer device 8A and carried. The transfer devices 8A to 8D have a characteristic of electrostatically attracting the image carried on the photosensitive drums 1A to 4A toward the transfer sheet S using positive corona discharge.

A separator 11 for the transfer sheet S is arranged at a position to which the transfer sheet S having undergone image transfer moves from the respective photosensitive drums 1A to 4A. Dischargers 12 are arranged opposite to each other, with the belt therebetween, at another part of the extended part. A cleaning device 13 removes toner remaining on the transfer belt 5.

The separator 11 performs negative AC corona discharge from above the recording medium S. Accordingly, charge accumulated on the transfer sheet S is neutralized to release the electrostatically attracted state. As a result, separation using the curvature of the transfer belt 5 is enabled, and generation of toner dust due to peeling discharge at the time of separation can be prevented. The discharger 12 neutralizes the accumulated charge on the transfer belt 5 to initialize the transfer belt 5 electrically by performing negative AC corona discharge, which is an opposite polarity to the charging characteristic by the transfer devices 8A to 8D, from front-back both sides of the transfer belt 5.

On the respective photosensitive drums 1A to 4A, surfaces thereof are uniformly charged by the chargers 1B to 4B. An electrostatic latent image is formed on the photosensitive drums 1A to 4A by using the optical scanning device 20 based on the image information for each color read by the reader 7 in the document reader 6. The electrostatic latent image is made visible by the toner of a color having a complementary relationship corresponding to the color supplied from the developing devices 1D to 4D. The electrostatic latent image is then electrostatically transferred onto the transfer sheet S carried on the transfer belt 5 via the transfer devices 8A to 8D.

The transfer sheet S, onto which the image (single color image) for each color carried on the respective photosensitive drums 1A to 4A has been transferred, is discharged by the discharger 12 and self-stripped by using the curvature of the transfer belt 5. Thereafter, the transfer sheet S moves to a fuser 14 to fix the toner in an unfixed image. The transfer sheet S is then ejected onto an ejection tray (not shown) provided outside the body of the image forming apparatus 1.

Figure 2:
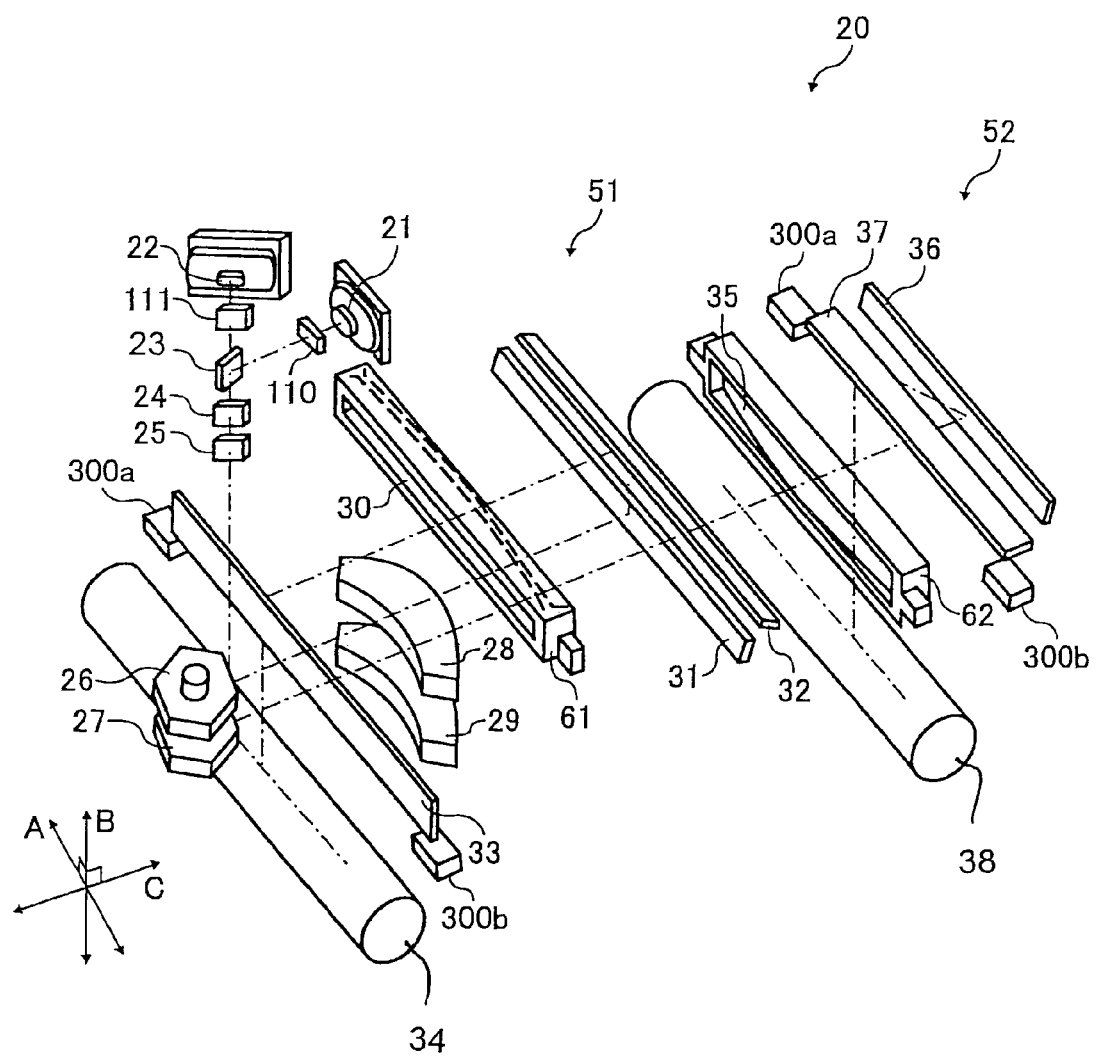
FIG. 2 is a schematic diagram of an optical scanning device shown in FIG. 1.

As shown in FIG. 2, the optical scanning device 20 is a tandem-type write optical system. FIG. 2 is a schematic diagram of the optical scanning device 20. While the optical scanning device 20 adopts a scanning lens system, it can be applicable to both the scanning lens system and a scanning mirror system. In FIG. 2, only two stations are shown for convenience sake. These two stations are arranged symmetrically on the opposite sides of polygon mirrors 26 and 27 as the deflector, thereby forming four stations in the image forming apparatus 1. Because the image forming apparatus 1 can form color images, when a color image is to be formed by the image forming apparatus 1, the optical scanning device 20 is used to form the color image.

The optical scanning device 20 has two LD units 21 and 22 including a light-emitting diode LD as a light source. The optical scanning device 20 images laser beams emitted from the LD units 21 and 22 on photosensitive drums 34 and 38 as image carriers. The optical scanning device 20 has optical element groups 51 and 52 formed of a plurality of optical elements corresponding to the LD units 21 and 22 and the photosensitive drums 34 and 38. Accordingly, the optical scanning device 20 is arranged correspondingly to the photosensitive drums 34 and 38. The photosensitive drums 34 and 38 each correspond to any one of the photosensitive drums 1A to 4A.

The optical element group 51 is formed of a plurality of optical elements, i.e., a prism (a write-start position-correcting unit 110), a folding mirror 23, a cylinder lens 24, the polygon mirror 26, a first scanning lens 28, folding mirrors 31 and 32, a second scanning lens 30, and a folding mirror 33. The optical element group 52 is formed of a plurality of optical elements, i.e., a prism (a write-start position-correcting unit 111 described later), a cylinder lens 25, the polygon mirror 27, a first scanning lens 29, a second scanning lens 35, and folding mirrors 36 and 37.

The optical scanning device 20 has a holding member 61 that holds the second scanning lens 30 of the optical elements forming the optical element group 51, and a holding member 62 that holds the second scanning lens 35 of the optical elements forming the optical element group 52. The holding member 61 and the second scanning lens 30, as the optical element to be held, held by the holding member 61, and the holding member 62 and the second scanning lens 35, as the optical element to be held, held by the holding member 62 have substantially the same configuration.

The LD units 21 and 22 are set at a different height in a sub-scanning direction B of the beam substantially in a perpendicular direction. The beam emitted from the upper LD unit 21 passes through the write-start position-correcting unit 110. The beam is then bent in the same direction as the beam emitted from the lower LD unit 22 by the folding mirror 23. The beam emitted from the lower LD unit 22 passes through the write-start position-correcting unit 111 before entering the folding mirror 23 and then passes through the folding mirror 23. The beams of the LD units 21 and 22 enter the cylinder lens 24 and 25 and are linearly focused near reflecting surfaces of the polygon mirrors 26 and 27, which are arranged in two upper and lower stages away from each other by a predetermined distance.

The beams deflected by the polygon mirrors 26 and 27 are subjected to beam forming by integrated or two-stage first scanning lens 28 and 29. The beams are then beam-formed to have an fθ characteristic and a predetermined beam spot diameter by the second scanning lens 30 and 35, thereby scanning the photosensitive surfaces of the photosensitive drums 34 and 38. Optical paths after the first scanning lens 28 and 29 are different because the beams are led to two different photosensitive drums 34 and 38.

The upper beam, i.e., the beam having passed the first scanning lens 28 is bent by the folding mirrors 31 and 32. The beam then enters the second scanning lens 30, which is an upper long plastic lens. The beam is then bent vertically downward in direction B by the folding mirror 33 to scan the photosensitive drum 34 in a main scanning direction A, which is the scanning direction of the beam.

The lower beam, i.e., the beam having passed the scanning lens 29 enter the second scanning lens 35, which is a lower long plastic lens, without entering the folding mirror on the way. The optical path of the beam is then bent by the two folding mirrors 36 and 37 to scan the photosensitive drum 38 arranged at a predetermined drum pitch in the main scanning direction A of the beam. In FIG. 2, arrow C indicates a direction of an optical axis of the second scanning lenses 30 and 35.

Beam-spot position detectors 300a and 300b, each having a function as a misregistration detector that detects the position of a beam spot, are arranged between the folding mirror 33, which is the closest to the photosensitive drum in the optical element group 51, and the photosensitive drum 34. The beam-spot position detectors 300a and 300b are also arranged between the folding mirror 37, which is the closest to the photosensitive drum in the optical element group 52, and the photosensitive drum 38.

Figure 3:
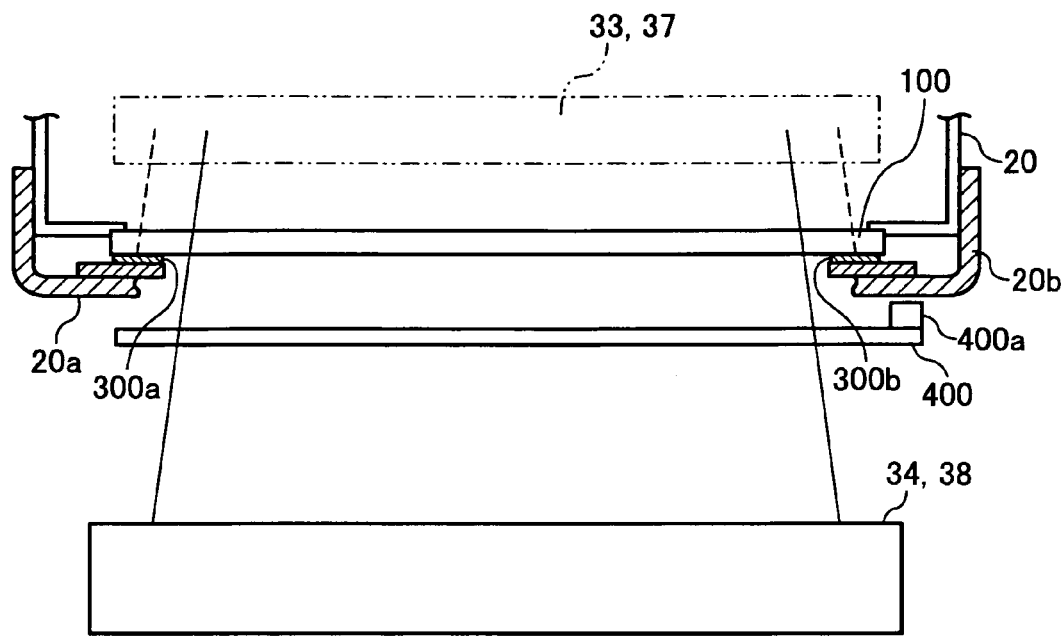
FIG. 3 is a schematic diagram of where beam-spot position detectors shown in FIG. 2 are located.

FIG. 3 is a schematic diagram of where the beam-spot position detectors 300a and 300b are located. The beam-spot position detectors 300a and 300b are arranged at positions to be capable of measuring the beam position by allowing all optical elements such as lenses and reflecting mirrors to act commonly to achieve correlation with the beam position irradiated onto the photosensitive drum 34 (or 38). That is, the position of the beam irradiated to the photosensitive drum 34 (or 38) can be directly detected by the beam-spot position detectors 300a and 300b without via other optical elements.

In FIG. 3, the respective beam-spot position detectors 300a and 300b are integrally fitted to a housing of the optical scanning device 20 corresponding to the light beams of respective colors. That is, the beam-spot position detectors 300a and 300b are put between connection brackets 20a and 20b, which are holding members, and a dustproof glass 100 through which the beam passes, and fixed. The beam from the folding mirror 33 or 37 passes through the dustproof glass 100. Among these beams, a beam in an effective image area is irradiated onto the photosensitive drum 34 or 38. The beam-spot position detectors 300a and 300b are arranged on the scanning line of the beam so that the beam outside the effective image area enters the beam-spot position detectors 300a and 300b. Because the beam position hardly changes due to the dustproof glass 100, the beam-spot position detectors 300a and 300b can be arranged on this side of the dustproof glass 100 (on the folding mirror 33 (or 37) side).

The beam-spot position detector 300a detects the write start position, and the beam-spot position detector 300b detects the write end position. Specifically, the beam-spot position detectors 300a and 300a can be at least one of a main-scanning synchronous detector and a sub-scanning beam position detector, to perform at least one of main scanning synchronization and sub-scanning detection of the beams. The beam-spot position detector 300b can detect at least one of main scanning magnification and scanning line inclination as the optical scanning device.

The scanning direction of the beams of two other stations (not shown in FIG. 2) are relatively opposite, and therefore, the write start and write end related to beam position detection of the beam-spot position detectors 300a and 300b are the other way around. That is, two in the four stations scan from the left on the image (traveling direction being upward) and remaining two stations scan from the right.

As shown in FIG. 3, a shutter 400 is provided between the beam-spot position detectors 300a and 300b and the photosensitive drums 34 and 38. When correction of out-of-color registration, described later, is performed, the shutter 400 shields the dustproof glass 100 so that the photosensitive drums 34 and 38 are not irradiated with the beam.

Figure 4:
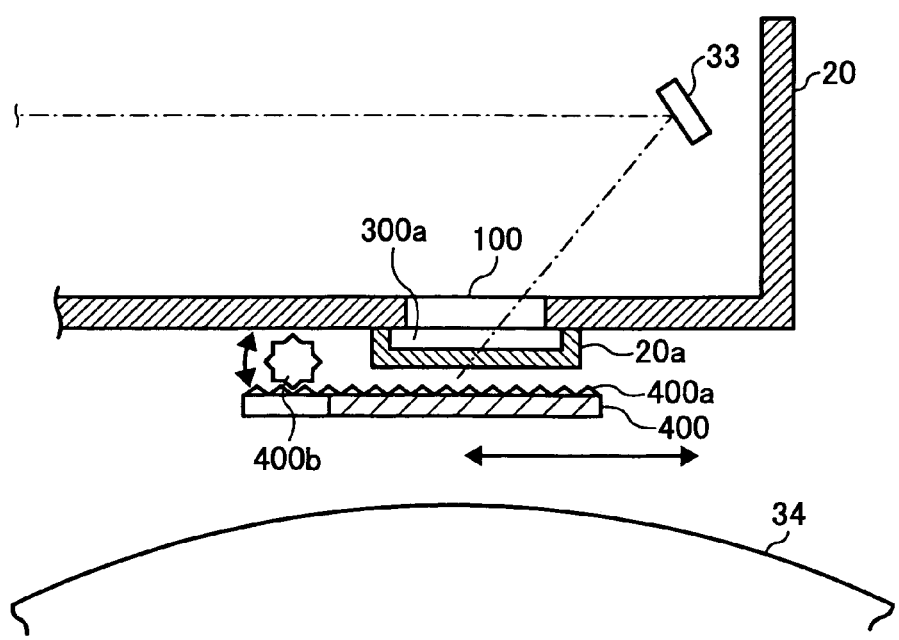
FIG. 4 is one example of a shutter mechanism.

An example of a shutter mechanism is shown in FIG. 4. The shutter 400 is arranged between the beam-spot position detectors 300a and 300b and the photosensitive drums 34 and 38 and can move parallel to the dustproof glass 100.

As shown in FIG. 4, teeth 400a are provided at one end of the shutter 400. A gear 400b engages with the teeth 400a, and a driving unit (not shown) is connected to the gear 400b.

At the time of performing correction of out-of-color registration described later, as shown in FIG. 4, the shutter 400 is put opposite to the dustproof glass 100, and the beam is shielded by closing the shutter 400, so that the beam is not irradiated onto the photosensitive drum. Therefore, at the time of performing correction of out-of-color registration, the beam is not irradiated onto the photosensitive drum, thereby reducing deterioration of the photosensitive drum due to the light.

When the latent image is formed on the surface of the photosensitive drum, the driving unit (not shown) is driven to rotate the gear 400b in a clockwise direction in FIG. 4. The shutter 400 then moves to the left in FIG. 4 via the teeth 400a that engage with the gear 400b. When the shutter 400 does not face the dustproof glass 100 and is in an opened state, the driving unit is stopped to suspend the movement of the shutter 400. At a timing of completion of latent image formation on the surface of the photosensitive drum or when the image formation job is complete, the driving unit is driven to rotate the gear 400b in a counterclockwise direction in FIG. 4. When the gear 400b is rotated in the counterclockwise direction in FIG. 4, the shutter 400 moves to the right in FIG. 4 and faces the dustproof glass 100 to close the shutter 400. When the shutter 400 is closed, the driving unit is stopped. Thus, at times other than when the image is formed, the shutter 400 is closed to cover the dustproof glass 100 with the shutter 400, thereby suppressing adhesion of foreign matter such as dust or dirt to the dustproof glass 100. Accordingly, occurrence of an abnormal image having a white spot or the like can be prevented.

When a plurality of images is successively printed, temperature in the image forming apparatus 1 rapidly changes due to heat from the polygon motors for driving the polygon mirrors 26 and 27 and the LD units 21 and 22 inside the optical scanning device 20, and due to heat from a heater at the time of fixing the toner in the fuser 14 outside the optical scanning device 20. In this case, the beam spot positions on the photosensitive drums 1A to 4A rapidly change as well, and hue of the output color image gradually changes as in the first sheet, several sheets afterwards, and after tens of sheets.

Therefore, correction by a scanning line adjusting unit described later is performed, using the beam-spot position detectors 300a and 300b as the misregistration detector (beam detector). The beam-spot position detectors 300a and 300b as the misregistration detector are formed of a nonparallel photodiode sensor. The beam-spot position detectors 300a and 300b also have a function for detecting a synchronization signal that determines the write start position in the main scanning direction.

Figure 5A:
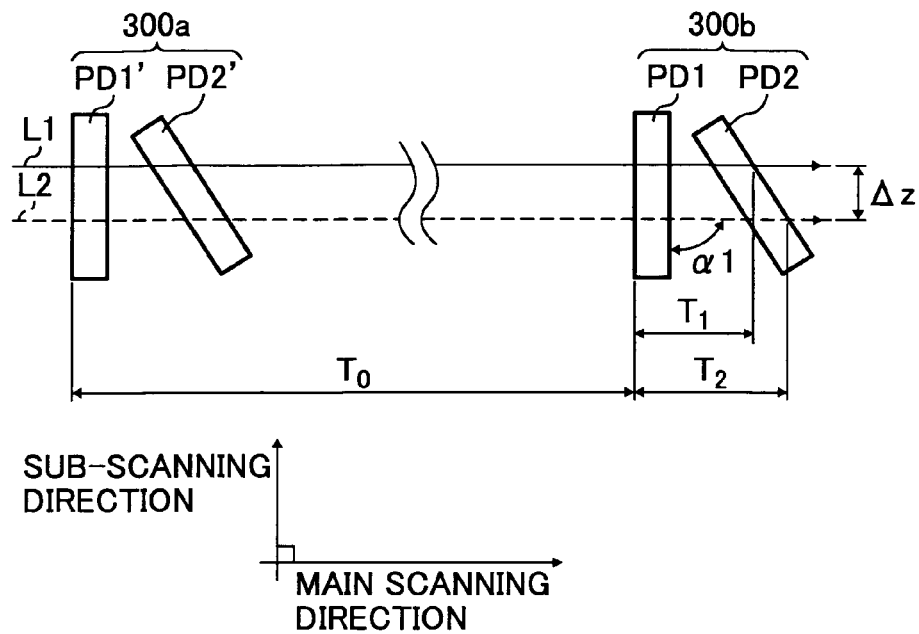
FIGS. 5A and 5B are schematic diagrams for explaining a detection by a nonparallel photodiode sensor as the beam-spot position detectors.
Figure 5B:
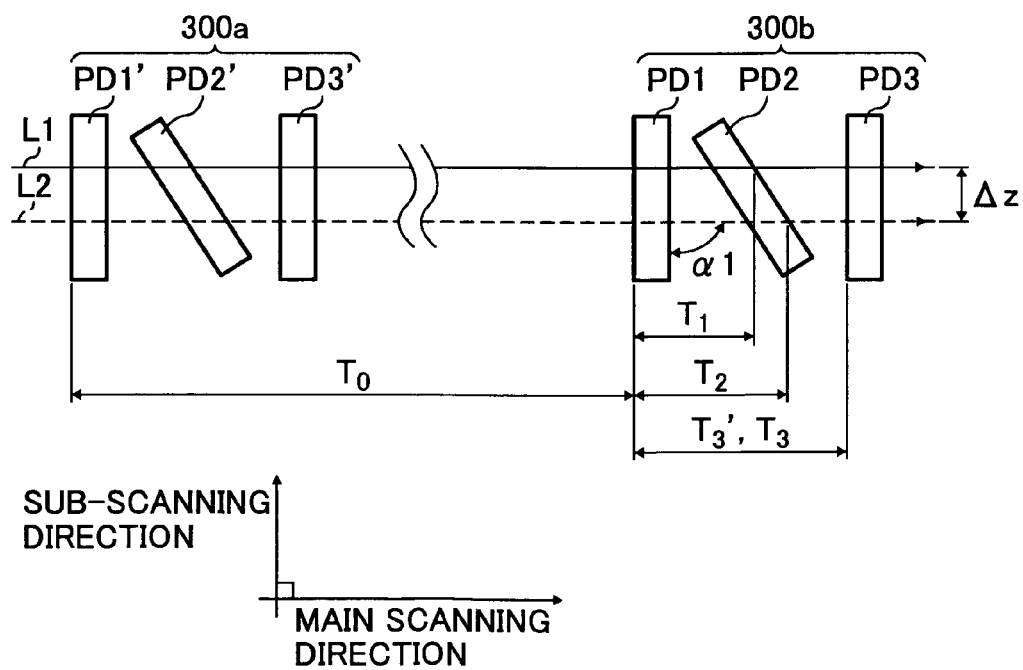

When scanning speed of the scanning beam is clear (for example, when the polygon mirror is locked), the beam-spot position detector shown in FIGS. 5A and 5B can be used.

As shown in FIG. 5A, light receiving surfaces of photodiodes PD1 and PD1', which are first photodetectors, are perpendicular to the scanning beam, and light receiving surfaces of photodiodes PD2 and PD2', which are second photodetectors, are inclined relative to the light receiving surfaces of the photodiodes PD1 and PD1'. An angle of inclination is designated as α1. When the scanning beam before the temperature change due to heat (set value) is designated as L1 and the scanning beam after the temperature change is designated as L2, it is assumed that the scanning beam is shifted by ΔZ (unknown) in the sub-scanning direction. In this case, a correction amount ΔZ of out-of-color registration can be calculated by obtaining a time difference (T2−T1) between time T1 and time T2 during which the scanning beams L1 and L2 pass through between a pair of photodiodes, i.e., between the photodiodes PD1 and PD2 or the photodiodes PD1' and PD2'.

A relative dot misregistration in the sub-scanning direction, i.e., the sub-scanning correction amount ΔZ can be easily calculated, because the angle α1 formed between the respective light receiving surfaces of PD 1 and PD2 and the time difference T2−T1 are known. The scanning line adjusting unit, described later, corrects the correction amount ΔZ.

Therefore, when a plurality of images are successively printed, the beam spot position on the photosensitive drums 1A to 4A can be corrected, even when the beam spot positions on the photosensitive drums 1A to 4A rapidly change due to a temperature change, or when the image data is being written. Magnification changes in the main scanning direction can be monitored by detecting a fluctuation of time T0 required for the scanning beam to pass through between the photodiodes PD1' and PD1.

On the other hand, when the scanning speed of the scanning beam is not clear, the beam-spot position detector shown in FIG. 5B can be used.

As shown in FIG. 5B, a photodiode PD3 is added (nonparallel type can be used, and at any order of PD1, PD2, and PD3 in the scanning direction). Times T3 and T3' during which the scanning beams L1 and L2 pass through between PD1 and PD3 or between the photodiodes PD1' and PD3' are measured by the photodiode. Because the distance between PD1 and PD3 are the same even when the position in the sub-scanning direction is different, a ratio between T3 and T3' becomes a speed ratio between the scanning speed of the scanning beam L1 and the scanning speed of the scanning beam L2. Time T2 during which the scanning beam L2 passes through between the photodiodes PD1 (PD1') and PD2 (PD2') is corrected by the ratio between T3 and T3'. Accordingly, the sub-scanning correction amount ΔZ can be calculated, even if a scanning speed V is not clear, from the angle α1 formed between the respective light receiving surfaces of PD1 and PD2 and the time difference between T2 and T1 corrected by the ratio between T3 and T3'. Because a gap between PD1, PD2, and PD3 is extremely small relative to the scanning speed, the scanning speed for passing through PD1, PD2, and PD3 can be made approximately constant. Therefore, the accurate sub-scanning correction amount ΔZ can be calculated even if the scanning speed of the scanning beam is not uniform. In the time difference between T2 and T1 corrected by the ratio between T3 and T3', a minute scanning speed change can be approximately offset.

In FIGS. 5A and 5B, the beam-spot position detectors 300*a* and 300*b* using the photodiode are shown; however, the photodetector other than the beam-spot position detectors 300*a* and 300*b* can be used as long as it can detect the beam position, and for example, a line CCD can be used.

The write position at one end of the main scanning direction based on not only the magnification but also the image carrier can be directly measured for respective beams (regardless of scanning start end or rear end) by measuring two positions for each beam.

Thus, the single color image can be corrected by various scanning line adjusting units based on the result detected by the beam-spot position detector 300*a* and 300*b*. The details of the correction are explained below.

The position and the angle between respective optical elements are changed due to heat generated by the polygon motor in the optical scanning device and due to a change in the environmental temperature. This causes a change in the sub-scanning position relative to the photosensitive drum, resulting in out-of-color registration. Depending on temperature, out-of-color registration (relative deviation between single color images) significantly varies, which cause degradation of image quality.

A conventional method has already been proposed of correcting out-of-color registration. In the conventional method, a pattern for detecting out-of-color registration is formed on a transfer member or the like, and detected by a read sensor to measure an amount of out-of-color registration, and image write timing is adjusted to reduce out-of-color registration. That is, according to the correction method, there is a slight change in position and size of each image forming unit, and further, in position and size of parts in the image forming unit due to a temperature change in a color image forming apparatus and an external force applied to the image forming apparatus, and out-of-color registration resulting from the change is detected and corrected. However, to ensure the calculation amount of out-of-color registration, a certain time is required for measuring a plurality of patterns to obtain an average, and the toner is consumed in vain. Therefore, the correction cannot be performed for every sheet of print, and is performed for every 200 sheets. With this timing, misregistration between colors gradually occurs due to heat generation by the polygon motor, thereby causing image degradation.

Therefore, the beam-spot position detectors 300*a* and 300*b* are arranged at beam emitting positions as a sub-scanning beam-position detection sensor for the beams irradiated from the optical scanning device, thereby detecting the irradiated beams accurately. Out-of-color registration between colors is then corrected temporally by using a deflecting element that deflects the beam in the sub-scanning direction.

Figure 6:
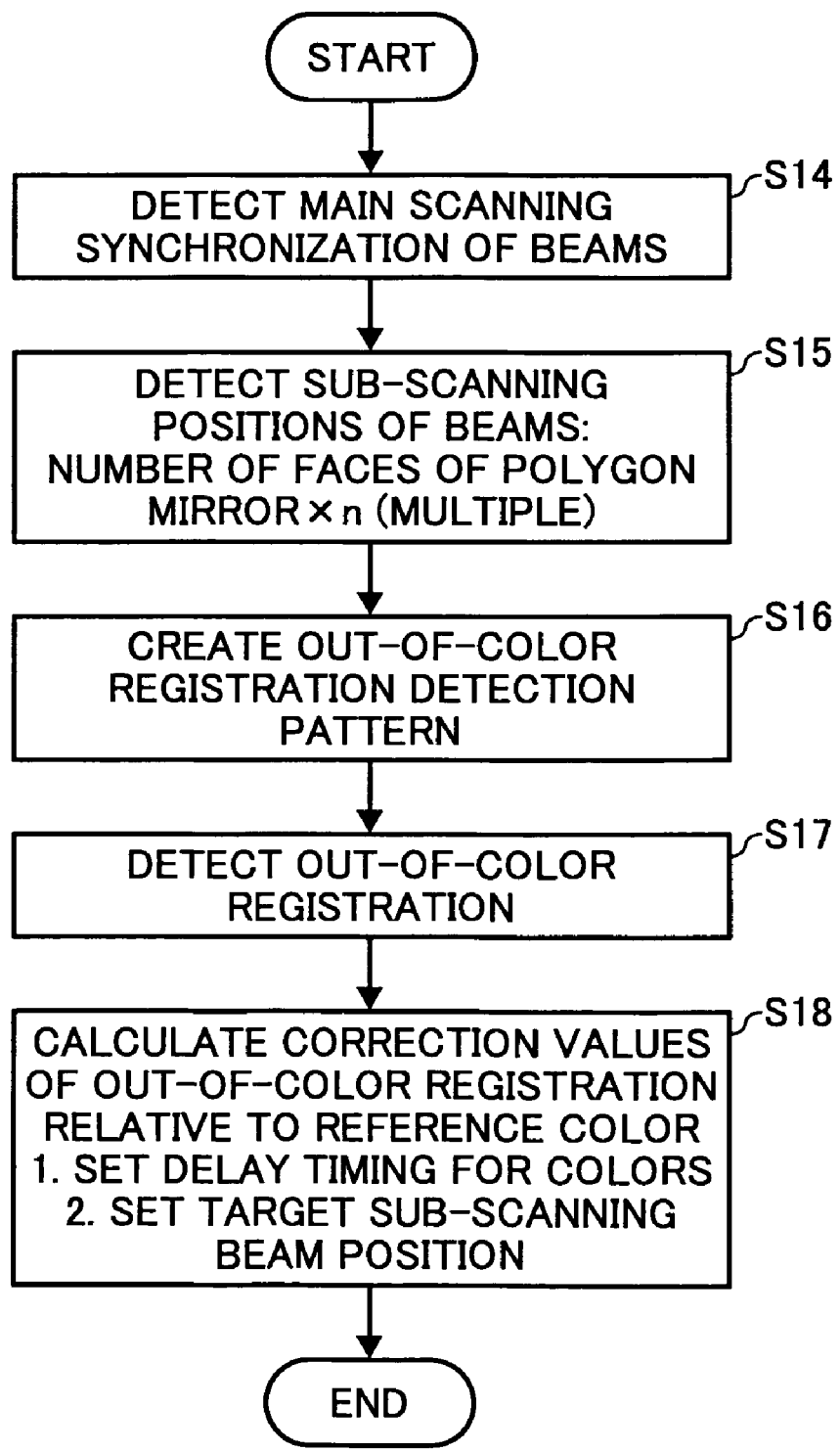
FIG. 6 is a flowchart of a process procedure for calculating a beam-position set value in a sub-scanning direction.

An out-of-color registration detection pattern is created to calculate a set value of the sub-scanning beam position. FIG. 6 is a flowchart of a process procedure for calculating a set value of the sub-scanning beam position.

After main scanning synchronization of respective beams is detected (S14), the sub-scanning positions of the beams are detected by the beam-spot position detector 300*a* or the beam-spot position detectors 300*a* and 300*b* (S15). Specifically, time T0 during which the beam passes through between the photodiodes PD1 and PD2 in the beam-spot position detector is measured. Because an optical face tangle error of the polygon mirror is different in one rotation of the polygon mirror, actually, the number of measurements slightly changes for each face, and there is a difference due to a read error of the sensor or the like. Accordingly, by setting the number of measurements to the number of faces of the polygon mirror (one rotation)×n (integral multiple), the sub-scanning beam position can be accurately detected.

An out-of-color registration detection pattern is created (S16). The sub-scanning beam positions of the respective colors and the out-of-color registration detection pattern are read (S17) to calculate a correction value of out-of-color registration for the colors relative to a reference color (S18). Specifically, a sub-scanning beam position in the single color image of the reference color (for example, black) and the time thereof are set as a reference, and a write-timing delay time of respective colors (colors other than the reference color, i.e., yellow, cyan, and magenta in this example) and the set value of the sub-scanning beam position of the optical scanning device 20 are calculated and stored in a memory. The set value of the sub-scanning beam position is obtained by calculating the detected sub-scanning beam position and out-of-color registration and adding the correction value equal to or less than one line. Specifically, time T1 shown in FIGS. 5A and 5B is calculated by time T0 as the detected sub-scanning beam position, the correction amount ΔZ equal to or less than 1 line determined by calculating out-of-color registration, the scanning speed V, and the angle α1, and time T1 is stored as the set value of the sub-scanning beam position in the memory. When the one shown in FIG. 5B is used as the beam-spot position detector, time T3 during which the scanning beam passes through between PD1 and PD3 is also measured and stored in the memory. Because the distance between PD1 and PD3 and the scanning speed V are known, time T3 can be calculated based on these pieces of information.

The sub-scanning beam position of the optical scanning device 20 is detected at predetermined timing such as at the time of normal printing. The sub-scanning beam position is compared with the set value of the sub-scanning beam position stored in the memory. The scanning line adjusting unit, described later, performs correction so that the sub-scanning beam position matches the position of the set value.

An out-of-color-registration correcting unit according to a first embodiment of the present invention is explained below. The out-of-color-registration correcting unit according to the first embodiment corrects out-of-color registration at the time of starting normal printing.

Figure 7:
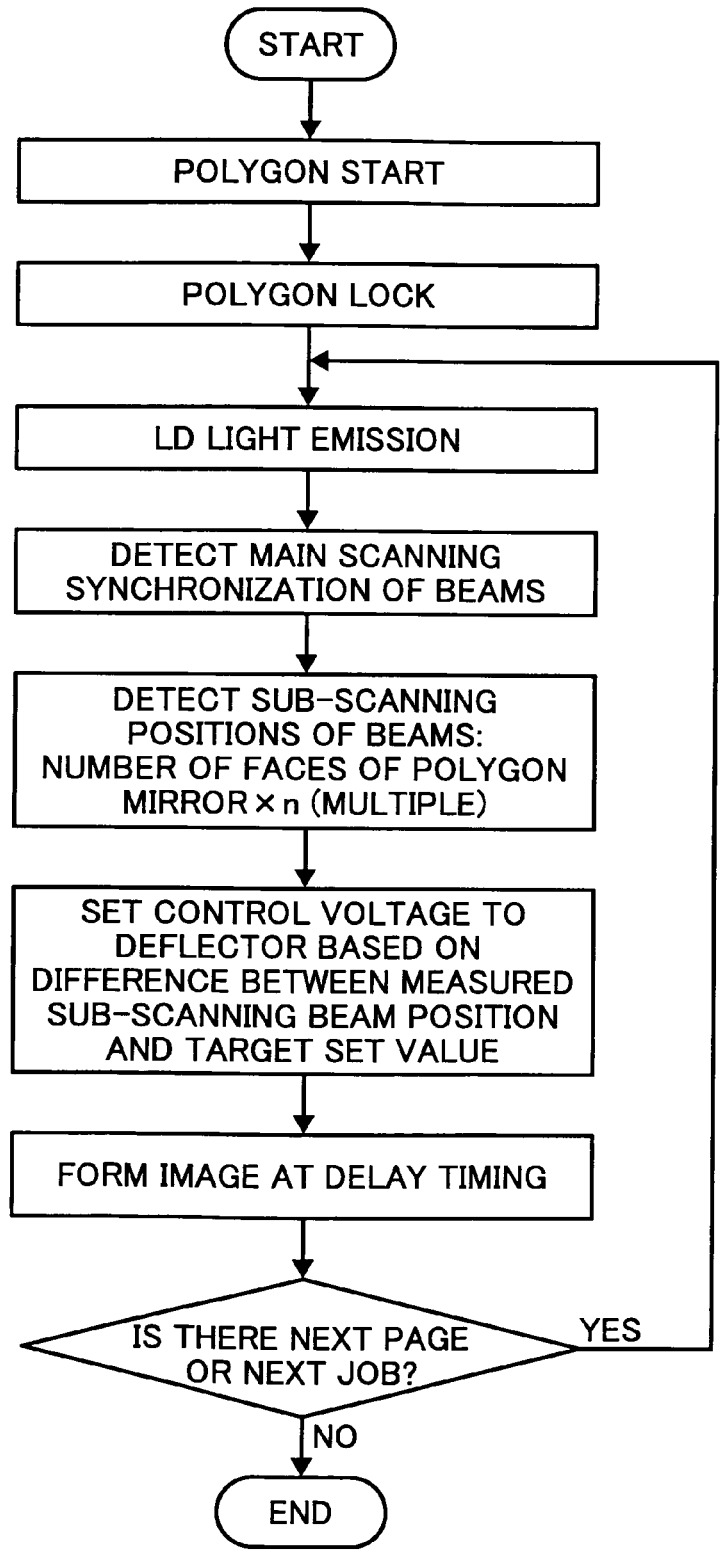
FIG. 7 is a flowchart of a process procedure for correcting out-of-color registration according to a conventional technology.

FIG. 7 is a flowchart of a process procedure for correcting out-of-color registration at the time of normal printing according to a conventional technology proposed by the present applicant in Japanese Patent Application Laid-open No. 2005-270093.

As shown in FIG. 7, upon start of printing, a drive voltage is applied to the polygon motor (polygon start). The rotation speed of the polygon mirror is gradually increased to a rotation speed for image formation. When the polygon mirror rotates at a constant speed equivalent to the rotation speed for image formation, a lock signal is issued. When a lock detector detects the lock signal (polygon lock), the light-emitting diode LD emits laser beams (LD light emission), and correction is performed such that the sub-scanning beam position matches the position of the set value. Generally, the time from polygon start to polygon lock is about 3 seconds to 7 seconds. In the conventional technology, the correction of out-of-color registration can be performed only after the time has passed.

According to the first embodiment, out-of-color registration is corrected at the time of printing by causing the light-emitting diode LD to emit laser beams before the polygon lock detector detects a lock signal, so that the sub-scanning beam position is corrected to match the position of the ser value. That is, out-of-color registration is corrected when the rotation speed (deflection speed) of the polygon mirrors 26 and 27 is equal to or lower than the rotation speed (deflection speed) at the time of performing image formation.

Figure 8:
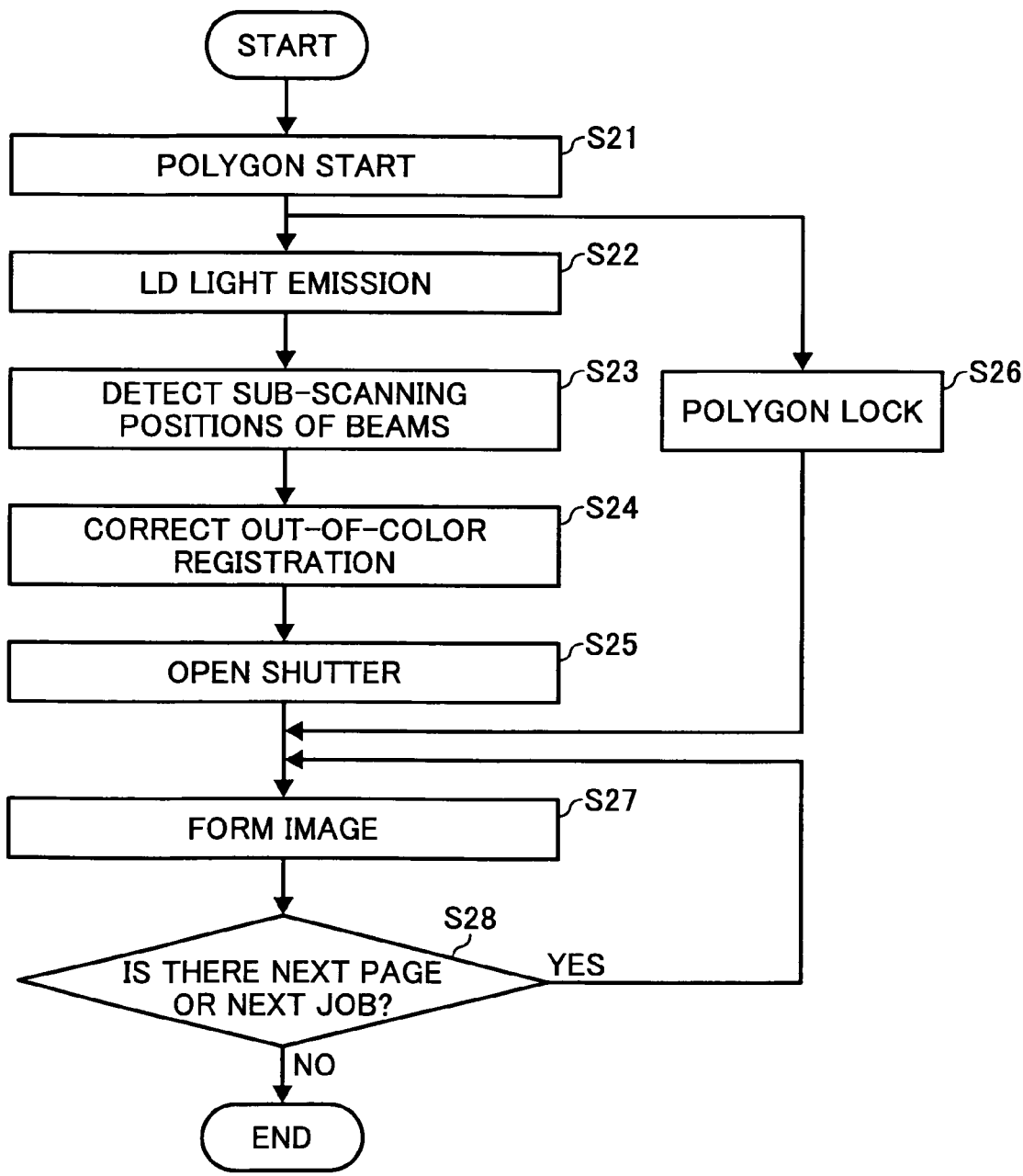
FIG. 8 is a flowchart of a process procedure for correcting out-of-color registration according to a first embodiment of the present invention.

FIG. 8 is a flowchart of a process procedure for correcting out-of-color registration according to the first embodiment.

As shown in FIG. 8, upon start of printing, a drive voltage is applied to the polygon motor (polygon start) (S21), and the light-emitting diode emits laser beams (S22). The sub-scanning positions of the respective laser beams are detected (S23). Specifically, time T2 during which the beams pass through between the photodiodes PD1 and PD2 in the beam-spot position detector and time T3' during which the beams pass through between the photodiodes PD1 and PD3 are measured. The correction amount ΔZ of out-of-color registration is calculated from the set value of the sub-scanning beam position (times T1 and T3) stored in the memory and the measurement value (T2 and T3'). The scanning line adjusting unit, described later, corrects out-of-color registration so that the sub-scanning beam position matches the position of the set value (S24). After the correction of out-of-color registration, the shutter 400 is opened (S25) so that the beams can be irradiated onto the photosensitive drum. The sub-scanning beam position is compared with the set value of the sub-scanning beam position stored in the memory. The scanning line adjusting unit, described later, corrects out-of-color registration so that the sub-scanning beam position matches the position of the set value (S24). After the correction of out-of-color registration, the shutter 400 is opened (S25) so that the photosensitive drum can be irradiated with the laser beams.

As for the measurement values (times T1 and T3'), sampling can be performed a number of times corresponding to a multiple of the number of faces (one rotation) of the polygon mirror. In this case, the correction amount ΔZ of out-of-color registration is calculated for each sampling, and, based on an average of calculated correction amounts, correction of out-of-color registration is performed.

Correction of out-of-color registration for matching the sub-scanning beam position with the set value can be performed for a unit of one scan of the deflector, or the correction in the sub-scanning direction can be performed for a unit of resolution finer than one scan of the deflector.

The correction amount of out-of-color registration can be calculated based on the result detected by any one of the beam-spot position detectors 300a or 300b. The out-of-color registration can be corrected based on an average of the correction amounts ΔZ of out-of-color registration calculated by the beam-spot position detectors 300a and 300b. However, when an inclination correction described later is not performed, it is desired to perform the correction of out-of-color registration based on the average of the correction amounts ΔZ of out-of-color registration calculated by the beam-spot position detectors 300a and 300b. This is because when out-of-color registration is corrected based on the correction amount ΔZ of out-of-color registration calculated based on the result detected by any one of the beam-spot position detectors 300a or 300b, one of the start position and the end position of the scanning beam can be matched with the set position; however, the other is largely away from the set position. As a result, there is a problem in that out-of-color registration at the start position or the end position increases.

On the other hand, when out-of-color registration is corrected based on the average of the correction amounts ΔZ of out-of-color registration calculated by the beam-spot position detectors 300a and 300b, the center of the scanning beam matches the set position. The start position and the end position deviate from the set position by the same amount. However, both of the start position and the end position of the scanning beam do not largely deviate from the set position, as compared with a case that out-of-color registration is corrected based on the correction amount ΔZ of out-of-color registration calculated based on the result detected by any one of the beam-spot position detectors 300a or 300b. Accordingly, out-of-color registration due to inclination can be suppressed as compared with a case that out-of-color registration is corrected based on the correction amount ΔZ of out-of-color registration calculated based on the result detected by any one of the beam-spot position detectors 300a or 300b.

The rotation speed of the polygon mirrors 26 and 27 is gradually increased even during the detection of the sub-scanning positions of respective beams and correction of out-of-color registration, and the polygon mirrors 26 and 27 rotate at a constant speed while out-of-color registration is being corrected or after out-of-color registration is corrected, whereby a lock signal (polygon lock) is detected (S26). When the polygon lock is detected, the image formation is started (S27).

It is desired that the light-emitting diode LD always emit laser beams during correction of out-of-color registration. This is because the sub-scanning beam position is detected while the rotation speed (deflection speed) of the polygon mirrors 26 and 27 are gradually increased, the time from write start position to the write end position is not constant as when the rotation speed (deflection speed) of the polygon mirrors 26 and 27 is constant. Therefore, when the light-emitting diode LD is controlled to emit the laser beams at predetermined timing when the scanning beam reaches the write start position and the write end position, there is a possibility that the light emitting timing can be shifted and the scanning beam cannot detected by the beam-spot position detector 300a and 300b. Accordingly, with the light-emitting diode LD emitting laser beams all the time while out-of-color registration is being corrected, the scanning beam can be reliably detected and the sub-scanning beam position can be reliably detected by the beam-spot position detectors 300a and 300b. The shutter 400 is in the closed state even when the light-emitting diode LD always emits the laser beams, and therefore, the photosensitive drum is not irradiated with a scanning beam, and does not deteriorate at the time of correcting out-of-color registration.

Thus, according to the first embodiment, when the polygon mirrors 26 and 27 start to rotate (polygon start) before detection of a lock signal, the correction of out-of-color registration is started. Therefore, the time from start of printing to start of the image formation can be reduced as compared with an apparatus that corrects out-of-color registration after detecting the lock signal. Accordingly, an excellent image without having out-of-color registration can be obtained and the printing operation time can be reduced.

An out-of-color-registration correcting unit according to a second embodiment of the present invention is explained next. The out-of-color-registration correcting unit corrects out-of-color registration upon completion of printing.

Figure 9:
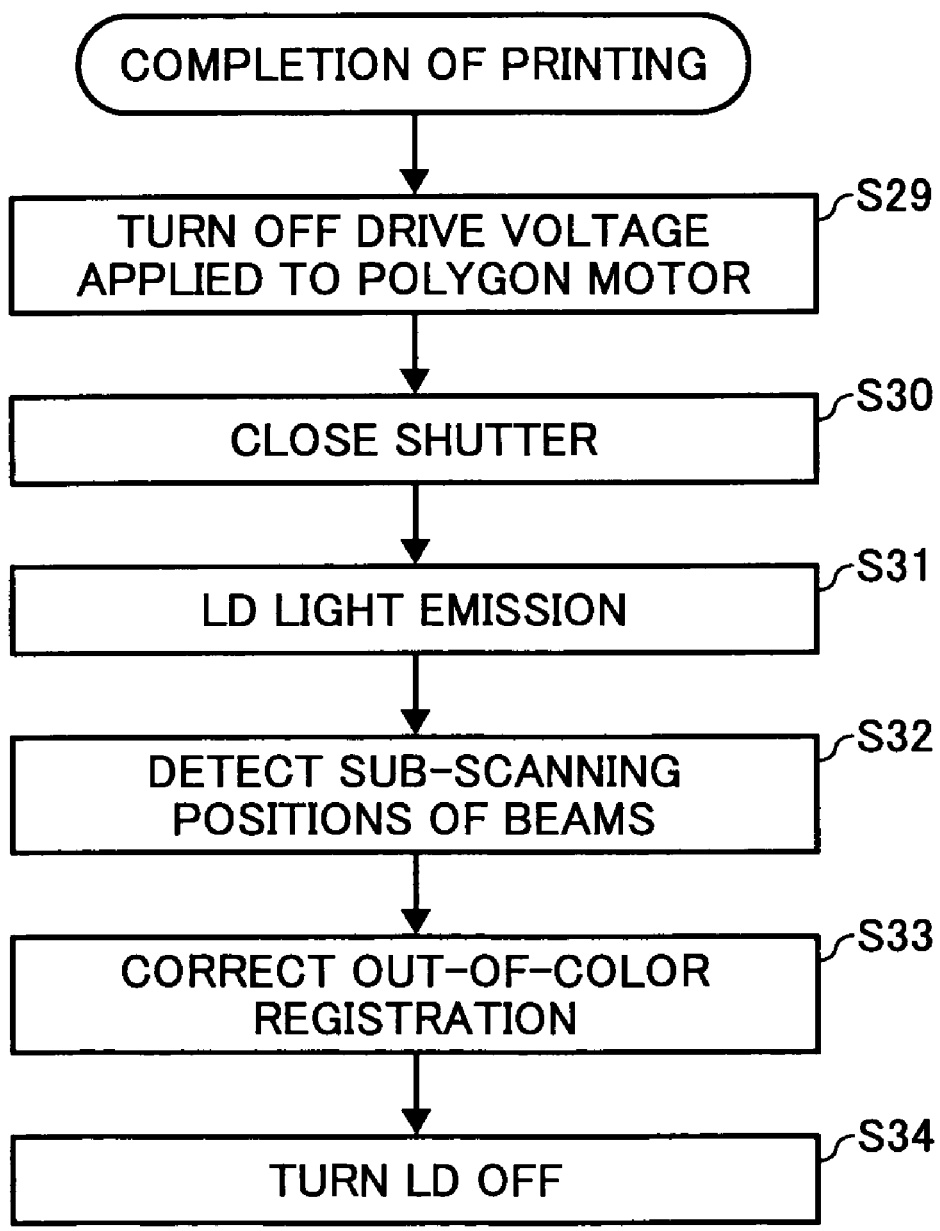
FIG. 9 is a flowchart of a process procedure for correcting out-of-color registration according to a second embodiment of the present invention.

FIG. 9 is a flowchart of a process procedure for correcting out-of-color registration according to the second embodiment.

On completion of printing, the drive voltage applied to the polygon motor is turned off (S29) and the shutter 400 is closed (S30), When the drive voltage to the polygon motor is OFF, the polygon mirrors 26 and 27 continue to rotate by inertia and are gradually decelerated to stop. The correction of out-of-color registration is performed during a period while the polygon mirrors 26 and 27 rotate by inertial and stop. That is, as shown in FIG. 9, when the drive voltage to the polygon motor is OFF (S29), the shutter is closed (S30), and the light-emitting diode LD emits laser beams (S31). The sub-scanning positions of the respective laser beams (times T2 and T3') are detected (S32) to calculate the correction amount ΔZ of out-of-color registration based on the set value of the sub-scanning beam position (times T1 and T3) stored in the memory and the detected value (times T2 and T3'). The scanning line adjusting unit, described later, corrects out-of-color registration so that the sub-scanning beam position matches the position of the set value (S33). When the correction of out-of-color registration is completed, the light-emitting diode LD is turned OFF (S34).

Thus, according to the second embodiment, out-of-color registration is corrected when the drive voltage to the polygon motor is OFF, and therefore, the correction of out-of-color registration can be performed in power saving mode.

As in the first embodiment, sampling of times T2 and T3' can be performed a number of times corresponding to the multiple of the number of faces (one rotation) of the polygon mirrors 26 and 27. The correction amount ΔZ of out-of-color registration is calculated for each sampling, and, based on an average of calculated correction amounts, correction of out-of-color registration is performed. However, rotation of the polygon mirrors 26 and 27 may stop during the sampling. When the rotation of the polygon mirrors 26 and 27 stops during the sampling, the correction of out-of-color registration will not finish. Therefore, such a control can be incorporated that when the drive voltage to the polygon motor is OFF, time count is started, and when the time count reaches a predetermined value, sampling is stopped, and an average of the sub-scanning positions is calculated based on the sampled values and designated as the sub-scanning position.

An out-of-color-registration correcting unit according to a third embodiment of the present invention is explained next. The out-of-color-registration correcting unit corrects out-of-color registration when the polygon lock is released for the next page or between jobs.

For example, there is a case that an image data amount for the first page is little, and the latent-image writing process is completed in a short time, and a stand-by time until the image formation for the next page becomes long. In this case, the polygon lock is turned off for power saving to make the rotation speed of the polygon mirror slower than that of at the time of performing image formation. According to the third embodiment, correction of out-of-color registration is performed when the stand-by time until the next page or the next job is long and the polygon lock is turned off.

Figure 10:
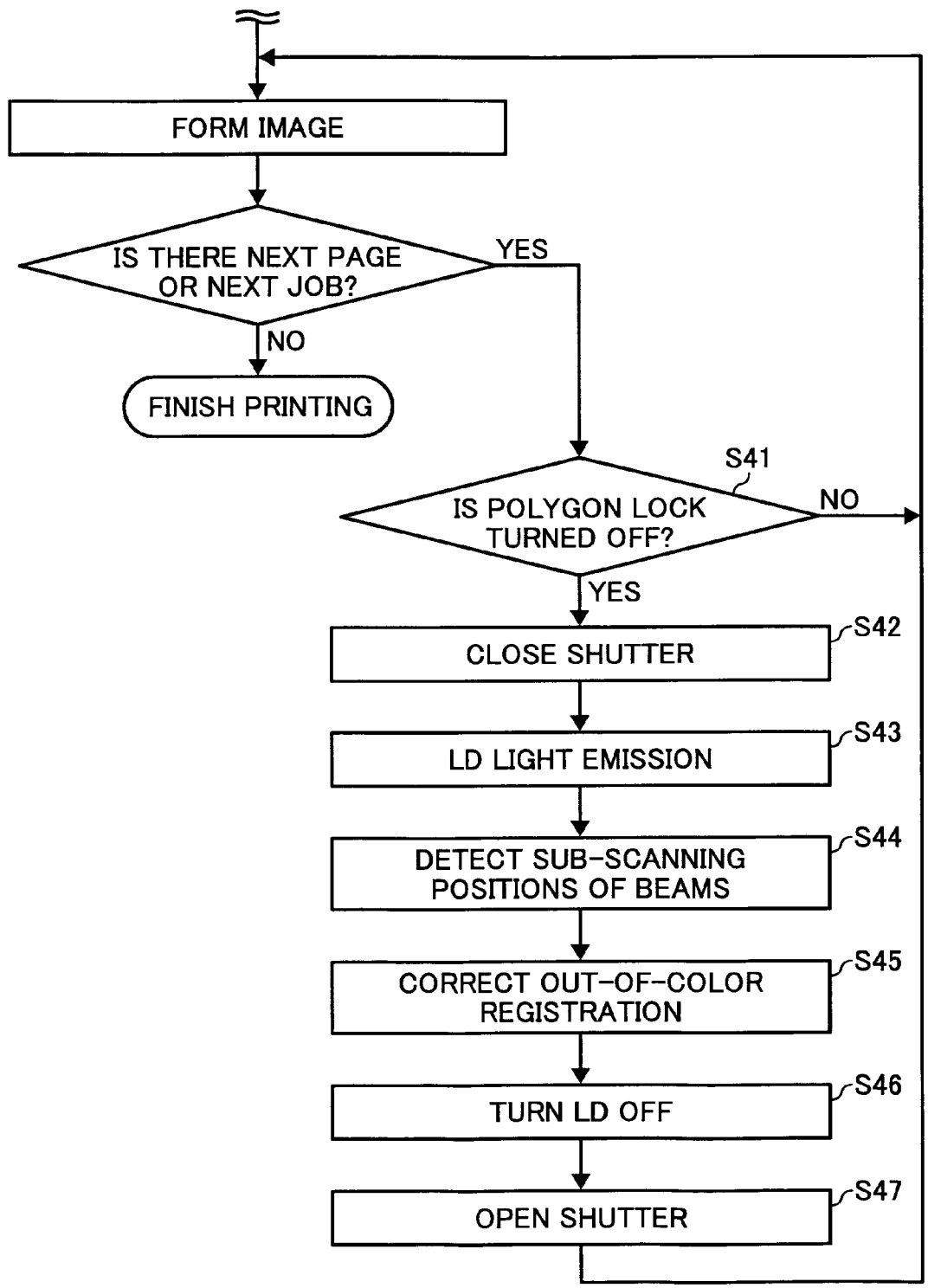
FIG. 10 is a flowchart of a process procedure for correcting out-of-color registration according to a third embodiment of the present invention.

FIG. 10 is a flowchart of a process procedure for correcting out-of-color registration according to the third embodiment.

As shown in FIG. 10, when there is the next page or the next job, the stand-by time until the next image formation is calculated, and when the stand-by time is equal to or longer than a predetermined value, the polygon lock is turned off (S41) to reduce the rotation speed of the polygon mirror lower than that for performing image formation. When the polygon lock is OFF and the number of revolutions of the polygon mirror is less than that for performing image formation (YES at S41), the shutter is closed (S42). When the shutter is closed, the light-emitting diode LD emits laser beams (S43), and the sub-scanning positions (times T2 and T3') of the respective laser beams are detected (S44). Correction amount ΔZ of out-of-color registration is calculated based on the set value of the sub-scanning beam position (times T1 and T3) stored in the memory and the detected value (T2 and T3'). The scanning line adjusting unit, described later, corrects out-of-color registration so that the sub-scanning beam position matches the position of the set value (S45). When the correction of out-of-color registration is completed, the light-emitting diode LD is turned off (S46). The shutter is then opened (S46) to perform the image formation for the next page. The rotation speed of the polygon mirror is increased during or after the correction of out-of-color registration to rotate the polygon mirror at a constant speed, and after the lock signal is detected (polygon lock), the image formation is performed.

According to the third embodiment, out-of-color registration is corrected while the rotation speed of the polygon motor is low for the next page or the next job. Therefore, energy can be used more effectively than a case where the polygon motor is rotated for correcting out-of-color registration.

An out-of-color-registration correcting unit according to a fourth embodiment of the present invention is explained next. The out-of-color-registration correcting unit corrects out-of-color registration when the apparatus is turned on, when the apparatus wakes up from power saving mode, and when a predetermined time has passed after previous correction of out-of-color, registration.

Figure 11:
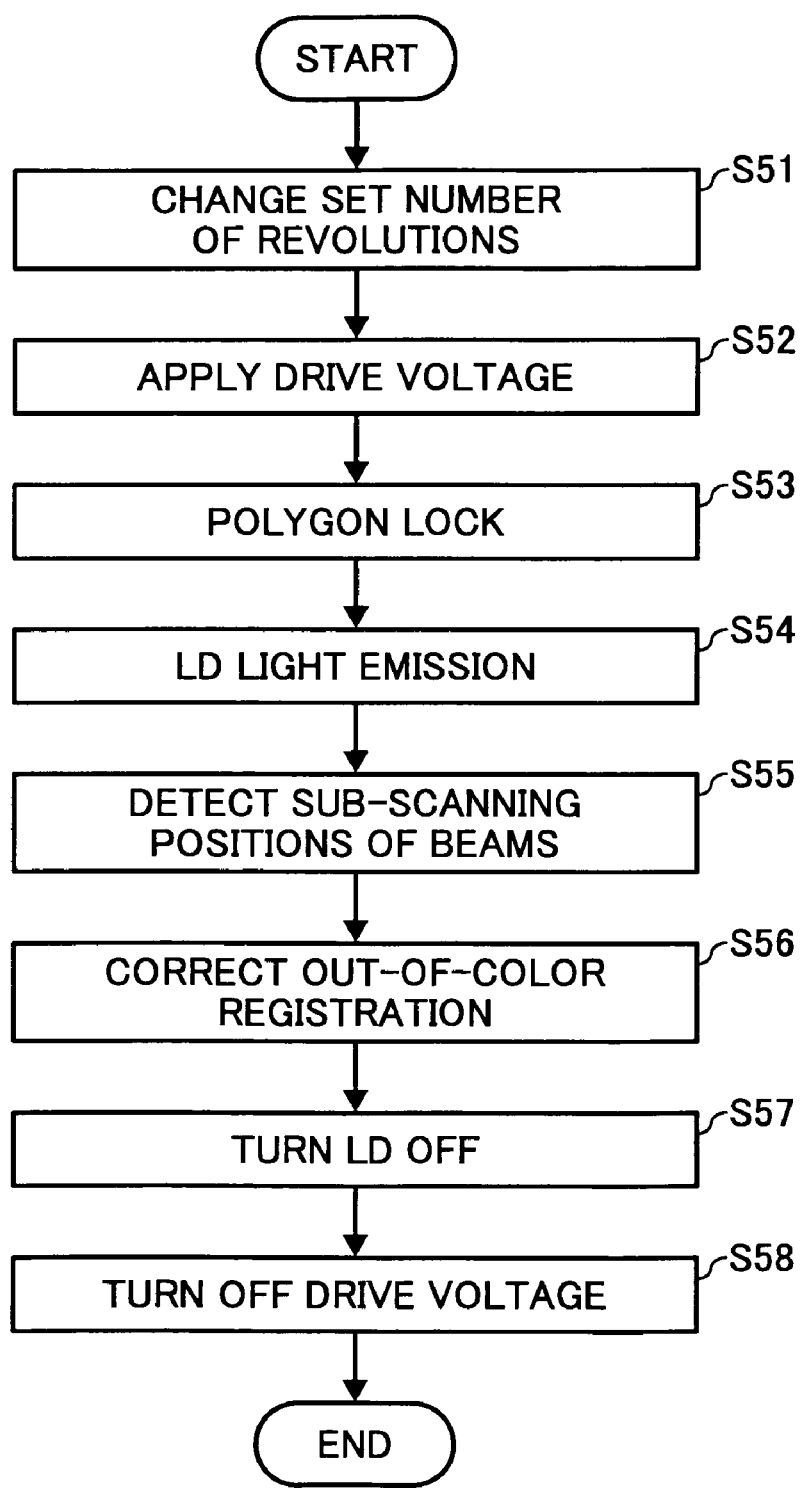
FIG. 11 is a flowchart of a process procedure for correcting out-of-color registration according to a fourth embodiment of the present invention.

FIG. 11 is a flowchart of a process procedure for correcting out-of-color registration according to the fourth embodiment.

At the predetermined timing such as when the apparatus is turned on, when the apparatus wakes up from power saving mode, and when a predetermined time has passed after previous correction of out-of-color registration, the correction of out-of-color registration is started. Upon start of the correction of out-of-color registration, the number of revolutions of the polygon motor is changed to 50% to 80% of that for forming an image (S51). The drive voltage is then applied to the polygon motor (S52) to start rotating the polygon mirrors 26 and 27. When the rotation speed of the polygon mirror is gradually increased and the polygon motor rotates at a constant speed set between 50% and 80% of the number of revolutions for forming an image, the lock signal is issued from a motor controller that controls the polygon motor. Upon detection of the lock signal (polygon lock) (S53), the light-emitting diode LD emits laser beams with a light emission amount reduced to 50% to 80% of that for forming an image in relation to the rotation speed (deflection speed) of the polygon mirror (S54). Even if the light emission amount of the light-emitting diode LD is reduced, because the deflection speed is slow, the time during which the scanning beam is irradiated onto the photodetectors of the beam-spot position detectors 300a and 300b increases. Therefore, even if the light emission amount of the LD is reduced as compared with that for forming an image, the quantity of light irradiated to the photodetector PD can be substantially the same as that at the time of forming an image. As a result, the beam-spot position detectors 300a and 300b can reliably detect the scanning beam.

When the light-emitting diode LD emits the laser beams, sampling is performed a number of times corresponding to a multiple of the number of faces (one rotation) of the polygon mirror. The average of the correction amounts ΔZ of out-of-color registration is calculated to detect the sub-scanning positions of the respective laser beams (S55), which are then compared with the set value of the sub-scanning beam position stored in the memory. The scanning line adjusting unit, described later, corrects the sub-scanning beam position to match with the position of the set value (S56). The light-emitting diode LD is turned off (S57), and the drive voltage to the polygon motor is turned off (S58).

According to the fourth embodiment, because the scanning speed of the scanning beam is clear, the beam-spot position detector shown in FIG. 5A can be used for the correction of out-of-color registration. However, time T1, which is the set value of the sub-scanning beam position stored in the memory, is the time during which the beam passes through between PD1 and PD2 at the scanning speed at the time of performing image formation. Measurement value T2 is the time during which the beam passes through between PD1 and PD2 at the scanning speed of 50 to 80% of that at the time of forming an image. Therefore, measurement value T2 is corrected by a ratio of the scanning speed at the time of forming an image to the scanning speed at the time of correcting out-of-color registration, and the correction amount ΔZ of out-of-color registration is calculated. Because the speed of the scanning beam at the time of correcting out-of-color registration is constant, which is different from the first to the third embodiments, the correction amount ΔZ of out-of-color registration can be calculated from the average of time T2 when sampling is performed a number of times corresponding to a multiple of the number of faces (one rotation) of the polygon mirror.

According to the fourth embodiment, out-of-color registration is corrected with a rotation speed of the polygon motor set between 50% and 80% of that for forming an image. Therefore, the polygon motor can be rotated at a constant speed with the set number of revolutions earlier as compared with an apparatus that corrects out-of-color registration at the number of revolutions for forming an image. Accordingly, the time required for the correction of out-of-color registration can be reduced. Because out-of-color registration is corrected at a less number of revolutions than that for forming an image, the drive voltage to the polygon motor can be suppressed and the correction of out-of-color registration can be performed in power saving mode. Besides, the rotation speed of the polygon motor is suppressed, which enables vibration of the motor to be controlled and the correction of out-of-color registration to be performed with low noise. Furthermore, because the light emission amount of the light-emitting diode LD is reduced to 50% to 80% of that at the time of forming an image, the correction of out-of-color registration can be performed in a better power saving mode.

The correction of out-of-color registration can be performed with lower noise by setting the rotation speed of the polygon mirror such that the frequency calculated by multiplying the number of revolutions of the polygon mirror by the number of mirrors becomes equal to less than 10 kilohertz. When the polygon mirror is rotated, rushing sound is generated because the polygon mirror is a polygonal cylinder. The frequency of the rushing sound generated by the polygon mirror is determined by the number of revolutions of the polygon mirror and the number of faces of the polygon mirror. By setting the rotation speed of the polygon mirror such that the frequency calculated by multiplying the number of revolutions of the polygon mirror by the number of mirrors becomes equal to less than 10 kilohertz, the rushing sound of the polygon mirror can be set to high-sensitivity frequency or less relative to human auditory characteristic.

The light-emitting diode LD can emit the laser beams all the time during the correction of out-of-color registration or can emit the laser beams at the time the scanning beam reaches the beam-spot position detectors 300a and 300b. Because the beams are blocked by the shutter 400 and not irradiated onto the photosensitive drum even if the light-emitting diode LD emits the laser beams all the time, the photosensitive drum does not deteriorate. In addition, because the laser beams are emitted at the time the scanning beam reaches the beam-spot position detectors 300a and 300b, the correction of out-of-color registration can be performed in power saving mode.

According to the fourth embodiment, out-of-color registration is corrected after constant-speed rotation of the polygon motor is detected (detection of lock signal); however, the correction of out-of-color registration can be performed without performing the lock signal detection. The correction of out-of-color registration can be performed without detecting the lock signal. Correction of out-of-color registration without detecting the lock signal is explained as a modification of the fourth embodiment.

Figure 12:
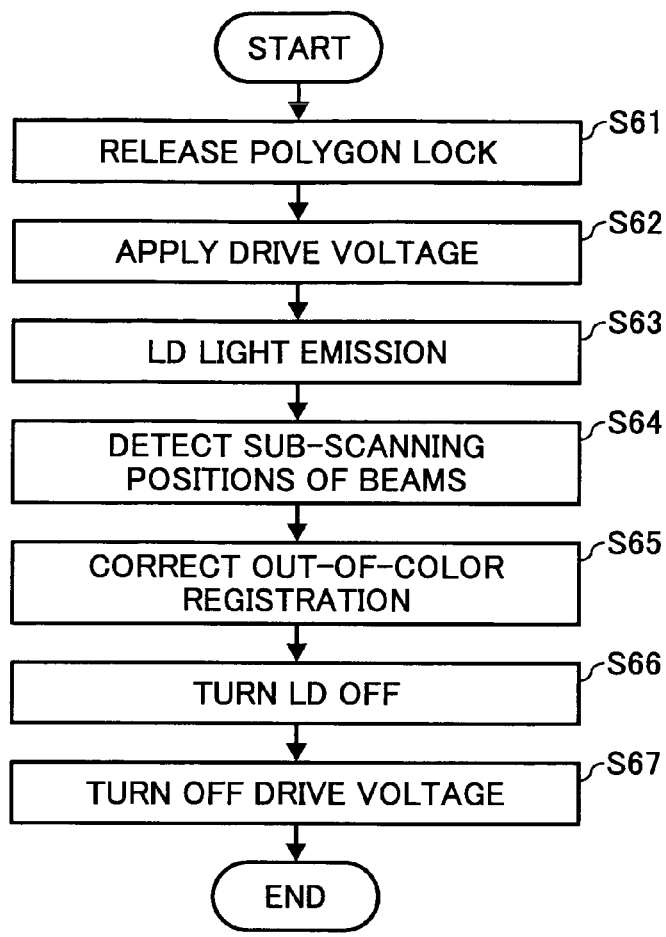
FIG. 12 is a flowchart of a process procedure for correcting out-of-color registration according to a modification of the fourth embodiment.
Figure 13:
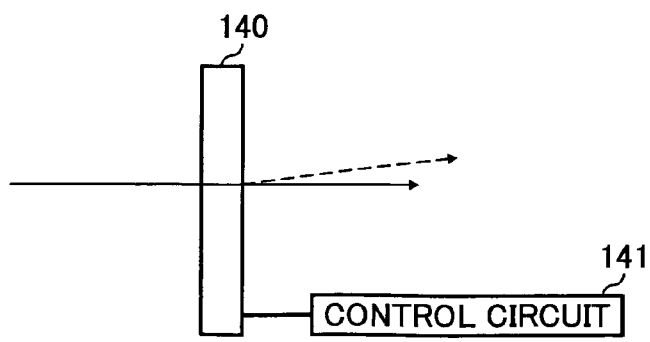
FIG. 13 is a schematic diagram of a scanning-line adjusting unit of Example A.

FIG. 12 is a flowchart of a process procedure for correcting out-of-color registration according to a modification of the fourth embodiment.

As shown in FIG. 12, when the correction of out-of-color registration is started at the predetermined timing, such as when the apparatus is turned on, when the apparatus wakes up from power saving mode, and when a predetermined time has passed after previous correction of out-of-color registration, the lock detection is released (S61). The drive voltage is applied to the polygon motor to rotate the polygon mirrors 26 and 27 (S62). When the polygon mirrors 26 and 27 rotate, the light-emitting diode LD emits laser beams (S63). In the modified example, because the rotation speed of the polygon mirrors 26 and 27 are not clear, the light-emitting diode LD is caused to emit the laser beams all the time. Even when the light-emitting diode LD emits the laser beams all the time, the beams are blocked by the shutter 400 and not irradiated onto the photosensitive drum, and the photosensitive drum does not deteriorate.

When the light-emitting diode LD emits the laser beams, sampling is performed a number of times corresponding to a multiple of the number of faces (one rotation) of the polygon mirror, as described above. The average of the correction amounts ΔZ of out-of-color registration is calculated to detect the sub-scanning beam position (S64). The sub-scanning beam position is then compared with the set value of the sub-scanning beam position stored in the memory. The scanning line adjusting unit, described later, corrects the sub-scanning beam position so that the sub-scanning beam position matches the position of the set value (S65). The light-emitting diode LD is turned off (S66), and the drive voltage to the polygon motor is turned off (S67).

In the modified example of the fourth embodiment, the sub-scanning positions of respective beams are detected by causing the light-emitting diode LD to emit laser beams immediately after start of rotation of the polygon mirrors 26 and 27, and therefore, the time required to correct out-of-color registration can be further reduced.

The scanning-line adjusting unit is explained next based on Examples A to C.

A scanning-line adjusting unit of Example A is explained below with reference to FIGS. 13 to 16.

Figure 14:
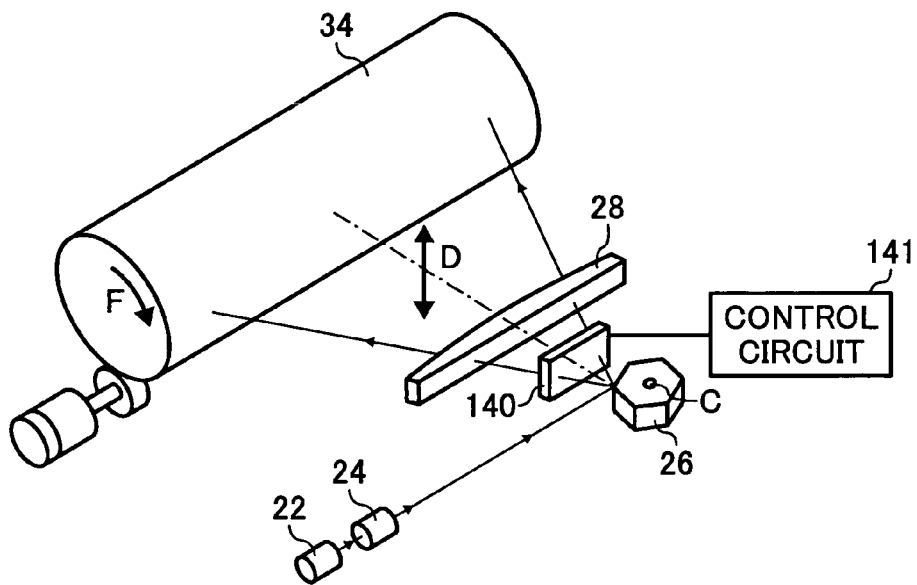
FIG. 14 is a schematic diagram of relevant parts of the optical scanning device including the scanning-line adjusting unit shown in FIG. 13.

The scanning-line adjusting unit is formed of a combination of (see FIG. 13) a liquid-crystal optical element 140 formed of liquid crystals and a control circuit 141 that applies a voltage to the liquid-crystal optical element 140. The liquid-crystal optical element 140 is arranged between a light source that emits light beams and the deflector, or between the deflector and the scanning lens. For example, FIG. 14 depicts an arrangement relationship of part of components in the optical scanning device 20 (the LD unit 22 as the light source, the cylinder lens (collimator lens) 24, the polygon mirror 26 as the deflector, the liquid-crystal optical element 140, the control circuit 141, and the scanning lens 28). The liquid-crystal optical element 140 is arranged between the polygon mirror 26 as the deflector and the scanning lens 28. The beam position of the light beams deflected to scan by the polygon mirror 26 can be corrected in direction D in FIG. 14 (sub-scanning direction) by the liquid-crystal optical element 140.

Figure 15:
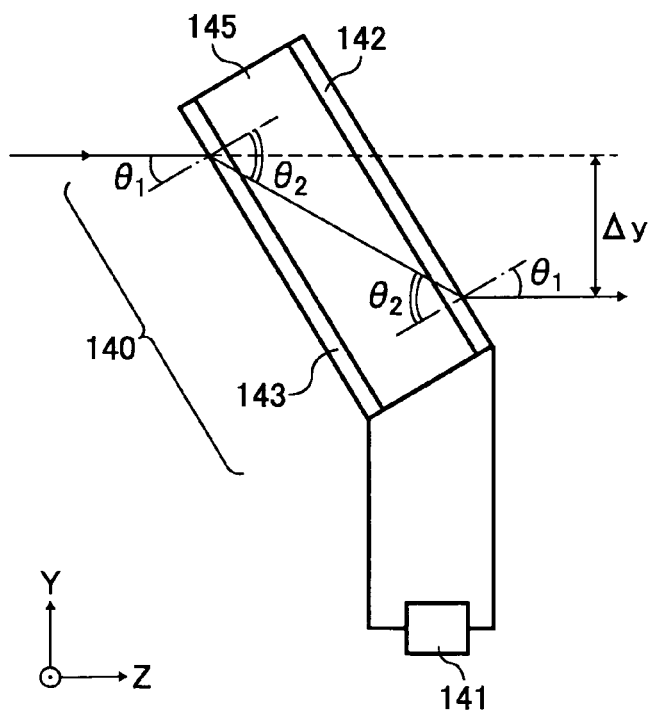
FIG. 15 is a schematic diagram for explaining a prism operation of a liquid crystal optical element.

As an example of the liquid-crystal optical element 140, as shown in FIG. 15, can be cited the one formed of substrates 142 and 143 having an electrode, and a liquid crystal layer 145. Accordingly, a prism operation is generated in the liquid crystal layer 145 by applying a predetermined potential difference to the electrodes from the control circuit 141 and the beam position can be corrected in the sub-scanning direction by translating the incident beams to the predetermined position.

Figure 16:
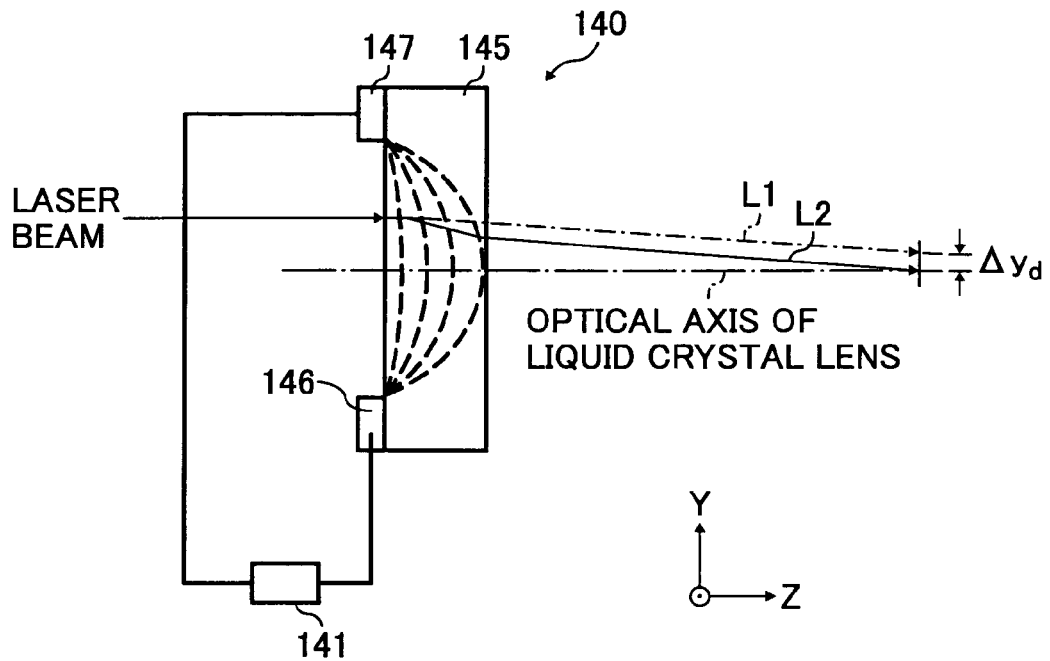
FIG. 16 is a schematic diagram for explaining a lens operation of the liquid crystal optical element.
Figure 17:
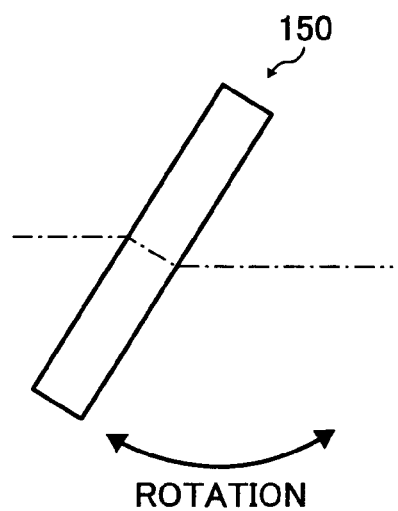
FIG. 17 is a schematic diagram of a scanning-line adjusting unit of Example B.

As another example of the liquid-crystal optical element 140, as shown in FIG. 16, can be cited the one formed of the liquid crystal layer 145 and electrodes 146 and 147 provided on the beam incident side of the liquid crystal layer 145.

Accordingly, a lens operation of a convex lens is generated by applying the predetermined potential difference to the electrode from the control circuit 141 and the beam position can be corrected in the sub-scanning direction by refracting the beams.

A scanning-line adjusting unit of Example B is explained next with reference to FIGS. 17 to 20.

In Example B, the scanning-line adjusting unit disclosed in Japanese Patent Application Laid-Open No. 2004-4191 is employed. That is, a parallel plate 150 is used, which is capable of transmitting the light beams and arranged rotatably on an axis parallel to an axis in the main scanning direction. The parallel plate 150 is arranged between the light source (the LD unit 22) that emits the light beams and the deflector (the polygon mirror 26) or between the deflector (the polygon mirror 26) and the scanning lens 28. The sub-scanning beam position can be corrected by allowing the light beams to enter the parallel plate 150 inclined due to the rotation (see FIG. 17).

Figure 18:
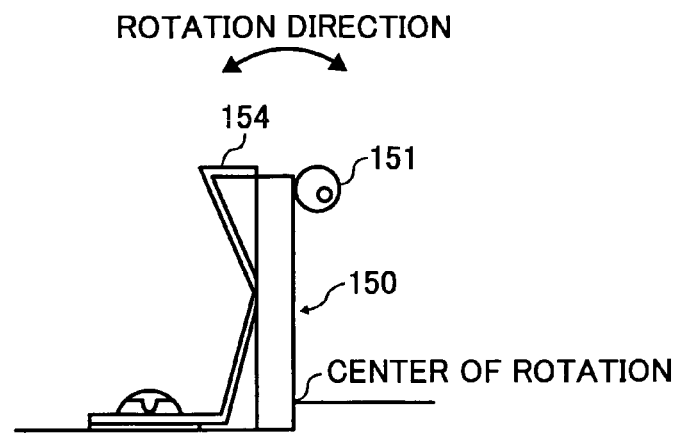
FIG. 18 is another schematic diagram of the scanning-line adjusting unit shown in FIG. 17.
Figure 19:
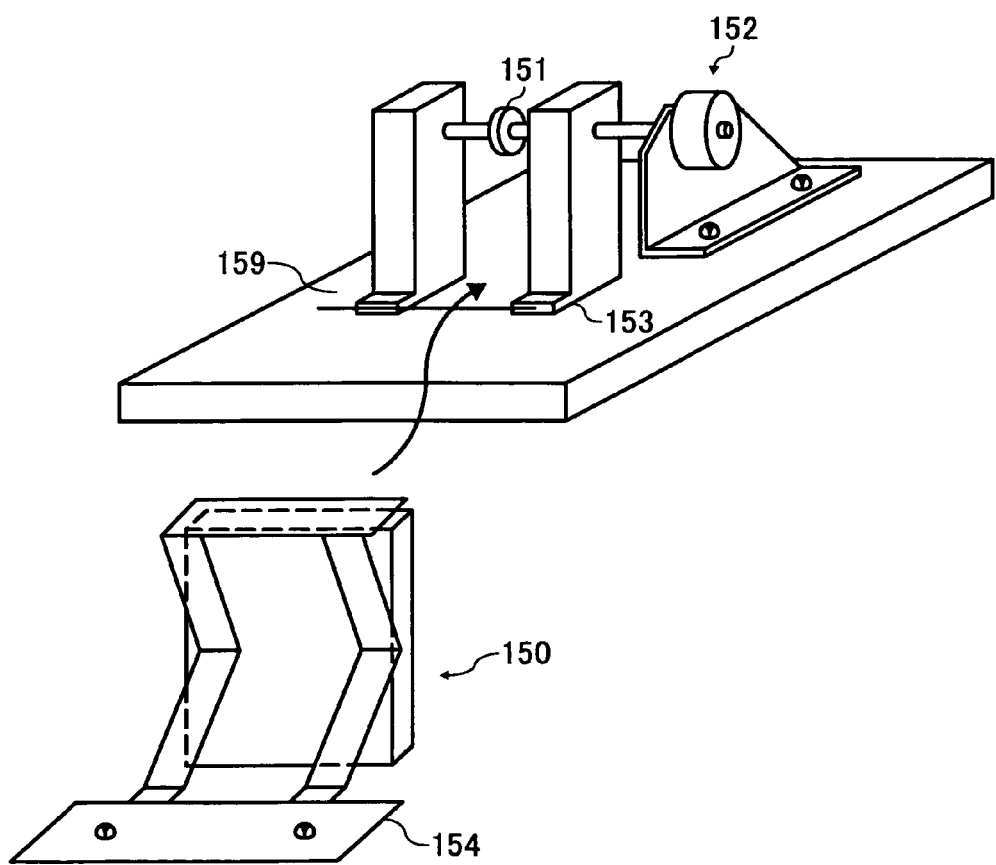
FIG. 19 is a perspective view of the scanning-line adjusting unit shown in FIG. 17.

FIG. 18 is a schematic diagram of the scanning-line adjusting unit of Example B including the parallel plate 150. FIG. 19 is a perspective view of the scanning-line adjusting unit.

The scanning-line adjusting unit includes an eccentric cam 151, an actuator 152 such as a stepping motor, a parallel-plate bump surface 153, a plate spring 154, a rotation axis 159, and the parallel plate 150.

In the parallel plate 150, lower two parts of the parallel plate 150 bump against a protrusion of a receiver and the upper side is fixed by the eccentric cam 151 and pressurized by the plate spring 154 from the other side. The actuator 152 is fitted to the eccentric cam 151 and the eccentric cam 151 rotates due to rotation of the actuator 152, to move the bumping position on the upper side of the parallel plate 150, thereby rotating the parallel plate 150 in a direction of arrow. At this time, the center of rotation becomes an axis passing through the lower bump surface (two parts). The center of rotation need not be on an optical axis.

Figure 20:
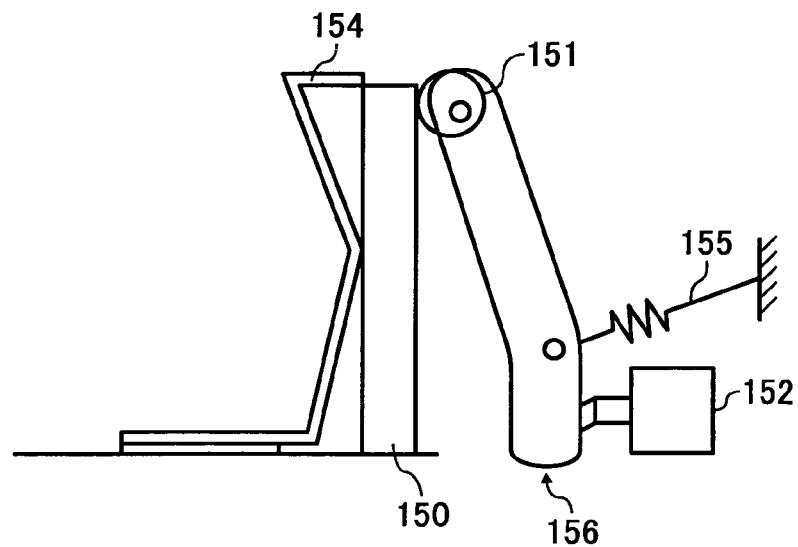
FIG. 20 is a modified example of the scanning-line adjusting unit shown in FIG. 17.

FIG. 20 a modified example of the scanning-line adjusting unit of Example B, in which a filler is provided to an eccentric cam shaft. In this case, the filler is fitted to the eccentric cam shaft, and the eccentric cam 151 is rotated by moving the filler, thereby rotating the parallel plate 150.

The light beams incident to the inclined parallel plate 150 is emitted parallel to the incident light beams, but shifted in the sub-scanning direction by the scanning-line adjusting unit, and an axial shift amount thereof increases in proportion to a rotation angle of the parallel plate 150.

Figure 21:
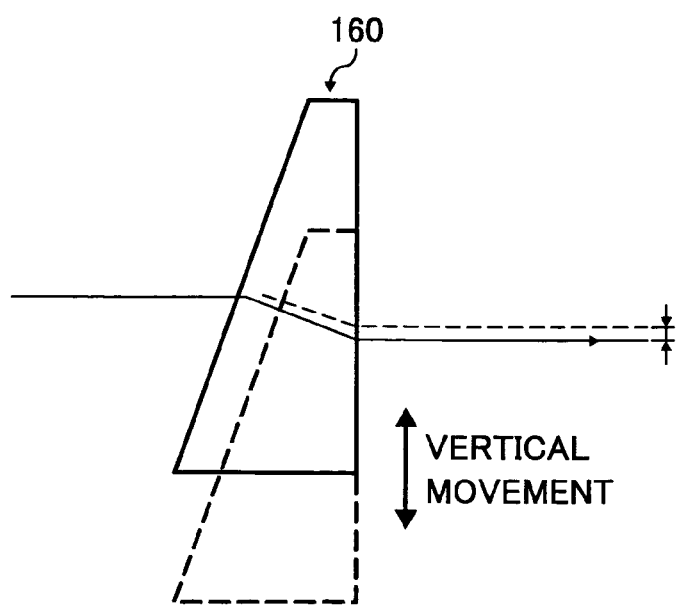
FIG. 21 is another modified example of the scanning-line adjusting unit shown in FIG. 17.

As shown in FIG. 21, a prism 160 having a trapezoidal cross section can be arranged instead of the parallel plate 150. In this case, the sub-scanning beam position can be corrected by translating the prism 160 to a predetermined position in the sub-scanning direction (up and down direction in FIG. 21). A configuration of the actuator around the prism 160 can be the one using the parallel-plate actuator.

A scanning-line adjusting unit of Example C is explained next with reference to FIGS. 22 to 25.

Figure 22:
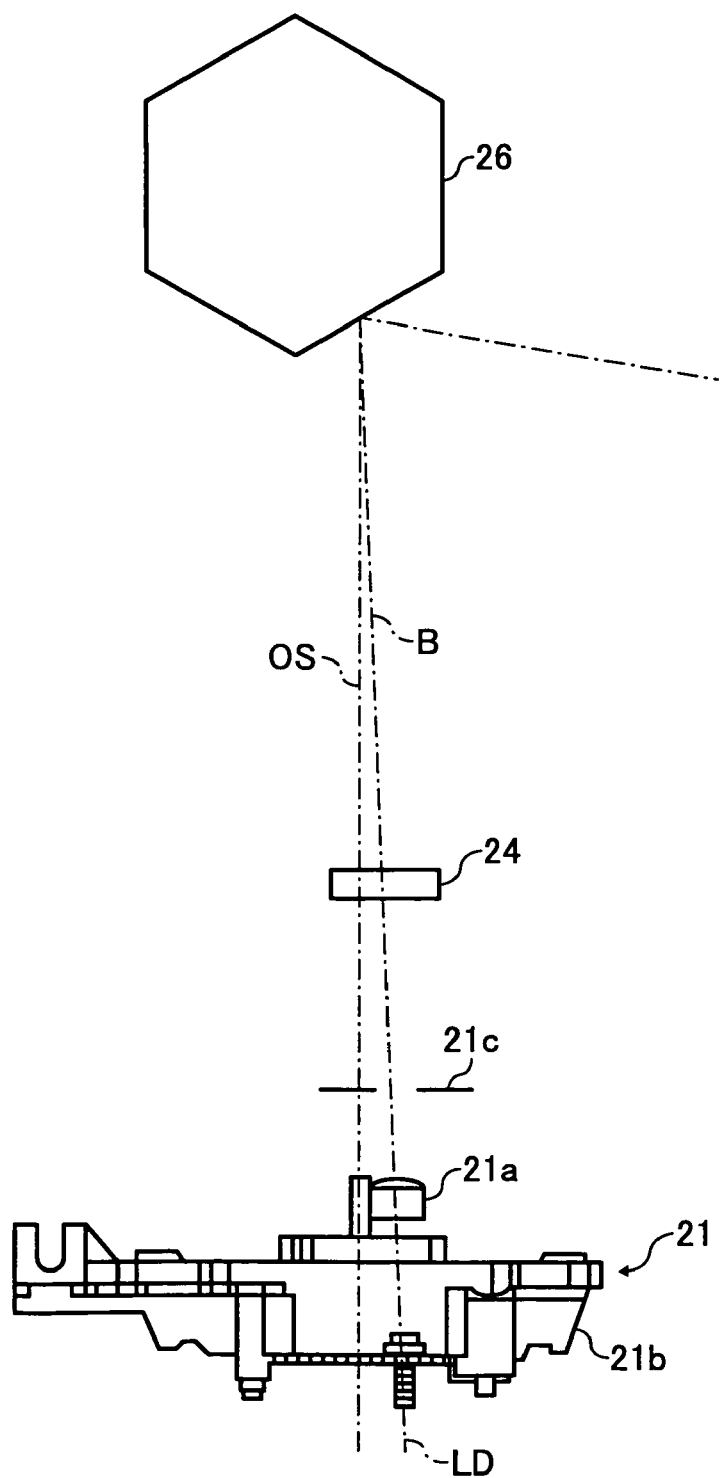
FIG. 22 is a plan view of a periphery of an LD unit as a scanning-line adjusting unit of Example C.

In Example C, the scanning-line adjusting unit disclosed in Japanese Patent Application Laid-Open No. 2003-330243 is employed. That is, as shown in FIG. 22, the light-emitting diode LD as the LD unit (optical element unit) 21 is held by a holding member 21b together with a collimator lens 21a, which is a coupling optical system. A light beam B emitted from the light-emitting diode LD is irradiated to the polygon mirror 26 via an aperture 21c set between the collimator lens 21a and the polygon mirror 26 and the cylinder lens 24. The LD unit 21 is rotatably fitted to an optical housing (not shown) that holds other optical elements that allow the light beam B to enter the polygon mirror 26 and the photosensitive drum 34 to constitute an optical unit. The LD unit 21 is fitted so that a rotation central axis OS of the LD unit 21 and the optical axis of the light beam B have a predetermined deviation mainly in the main scanning direction. The rotation central axis OS of the LD unit 21 and the optical axis of the beam are approximately made to agree with each other at a deflected position of the polygon mirror 26.

Figure 23:
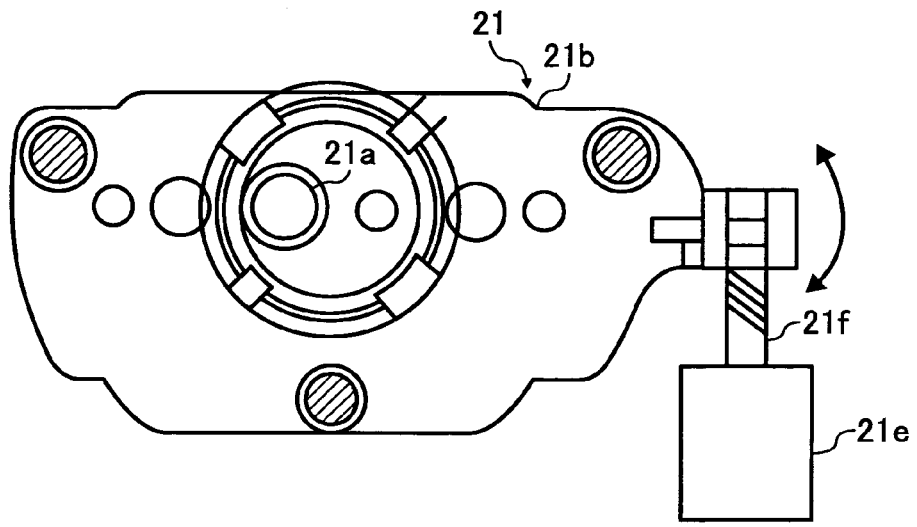
FIG. 23 is a front view of the LD unit shown in FIG. 22.

As shown in FIG. 23, a lead screw 21f of a beam position-adjusting motor 21e engages with one end of the LD unit 21 in the sub-scanning direction. When the beam position-adjusting motor 21e rotates, the lead screw 21f rotates. The LD unit 21 then rotates as shown by arrow in FIG. 23, centering on the rotation central axis OS.

Figure 24:
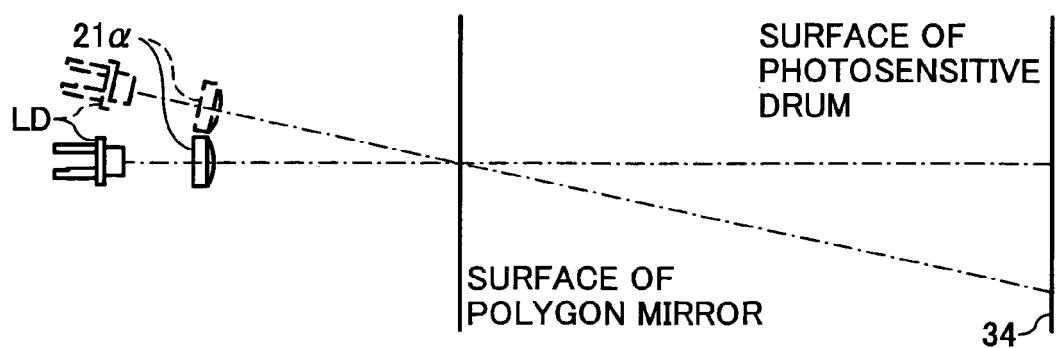
FIG. 24 is a schematic diagram for explaining beam displacement on a photosensitive drum due to rotation of the LD unit shown in FIG. 22.

The LD unit 21 rotates about the rotation central axis OS. As shown in FIG. 24, the LD unit 21 formed of the light-emitting diode LD and the holding member 21b that holds the coupling optical system displaces in the sub-scanning direction. Accordingly, the laser irradiation position is shifted.

Figure 25:
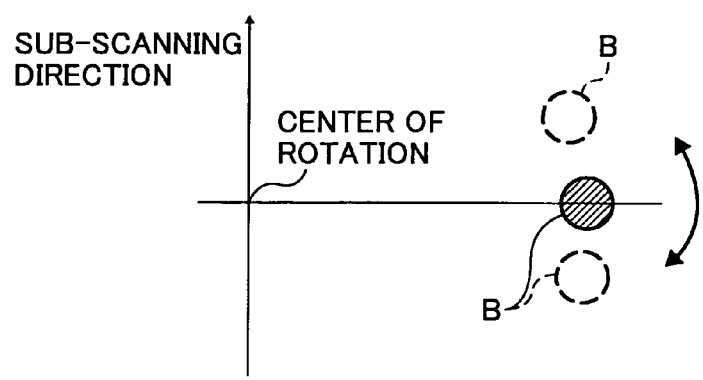
FIG. 25 is a schematic diagram for explaining movement of a beam in the sub-scanning direction on the photosensitive drum due to rotation of the LD unit shown in FIG. 22.

As a result, as shown in FIG. 25, the light beam B emitted from the light-emitting diode LD moves in the sub-scanning direction on the photosensitive drum 34 about the rotation axis and the beam irradiation position is shifted.

Thus, iteration stability can be improved and out-of-color registration can be corrected high accurately by rotating the LD unit 21 about the rotation central axis OS.

An inclination of the scanning line in each single color image of each color changes due to an installation state of the entire apparatus, environmental temperature, or the like, and the change causes out-of-color registration in the sub-scanning direction.

Figure 26:
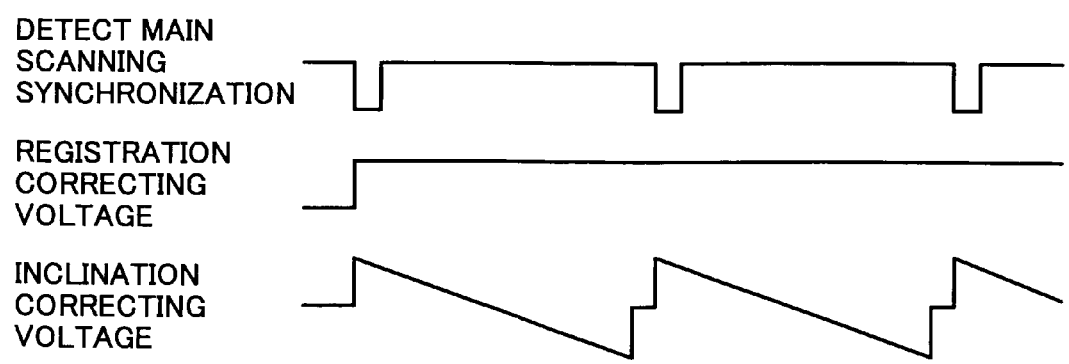
FIG. 26 is a schematic diagram of a pattern of voltage applied to a deflector that corrects inclination of a scanning line in a single color image.

As a conventional method of correcting such an inclination, out-of-color registration detection patterns are created in a plurality of lines (at least two lines) on an intermediate transfer belt to measure out-of-color registration due to the inclination between respective colors by a plurality of read photosensors corresponding to the positions thereof. An inclination amount relative to the reference color is then calculated to correct the inclination of the beam by the scanning-line adjusting unit based on the amount. More specifically, the inclination amount is designated as a correction amount for each color to calculate an apply voltage to the deflecting element based on the correction amount. However, the voltage waveform shows a voltage, which changes during scanning of one line as shown in FIG. 26, and the inclination of the beam is corrected by repeatedly supplying the voltage, using a main-scanning synchronous detection signal as a trigger.

In the above embodiments, the beam-spot position detectors 300a and 300b shown in FIG. 2 are used as the inclination detector instead of the read photosensor to correct the inclination of the beam by the scanning-line adjusting unit based on the detection result. That is, an inclination of a single color image is obtained based on two sub-scanning misregistration amounts detected by the beam-spot position detectors 300a and 300b. The inclination is corrected according to the inclination amount.

Alternatively, the sub-scanning beam position, i.e., the scanning start end and rear end, of the beam emitted from the optical scanning device is detected using the beam-spot position detectors 300a and 300b, before the out-of-color registration detection pattern is formed. The target beam position at the scanning start end and rear end is calculated by using the inclination amount measured by the read photosensor by reading the out-of-color registration detection pattern as the correction amount, and stored in the memory. In normal printing, the correction voltage shown in FIG. 25 can be applied to obtain the target beam position, using the synchronization detection signal as a trigger. When this method is used, a temperature increase in the apparatus at the time of successive printing or an inclination change due to environmental variation can be handled.

Figure 27:
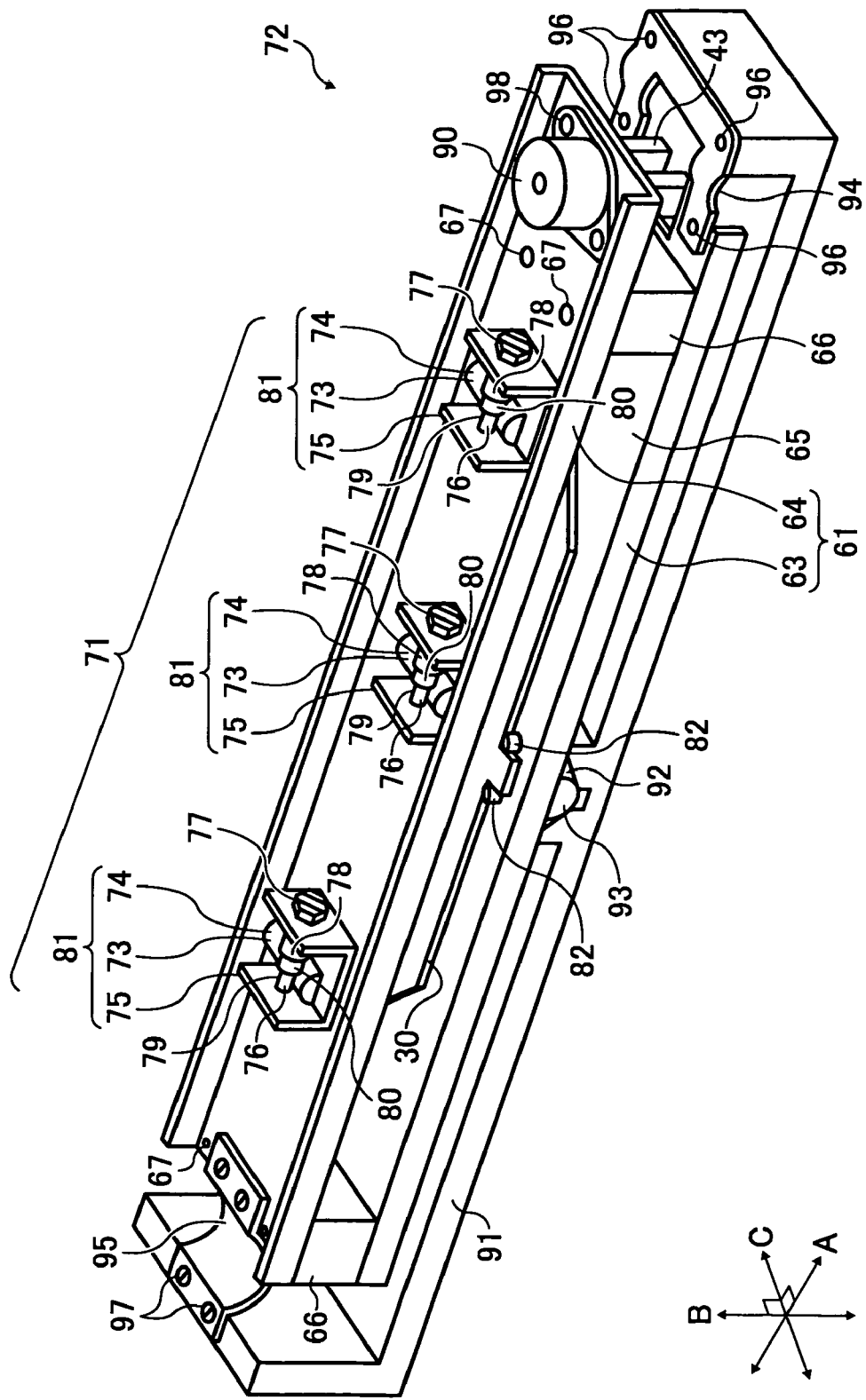
FIG. 27 is a perspective view of relevant part of a scanning-line-inclination correcting unit in the optical scanning device.
Figure 28:
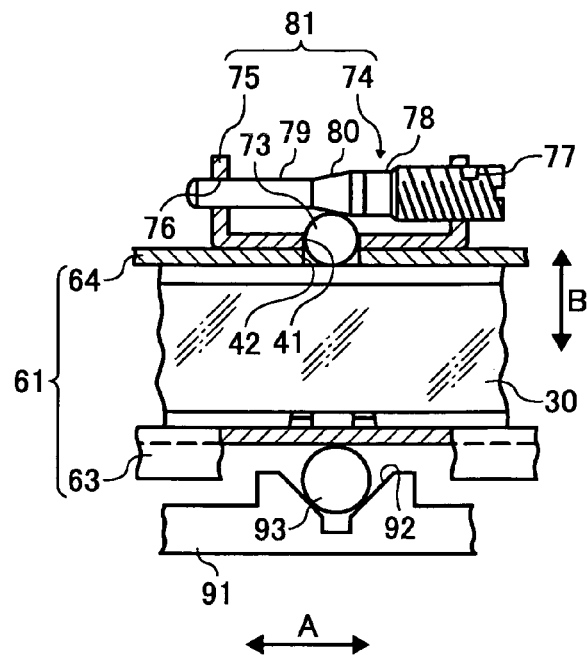
FIG. 28 is a cross section of relevant part of the scanning-line-inclination correcting unit.
Figure 29:
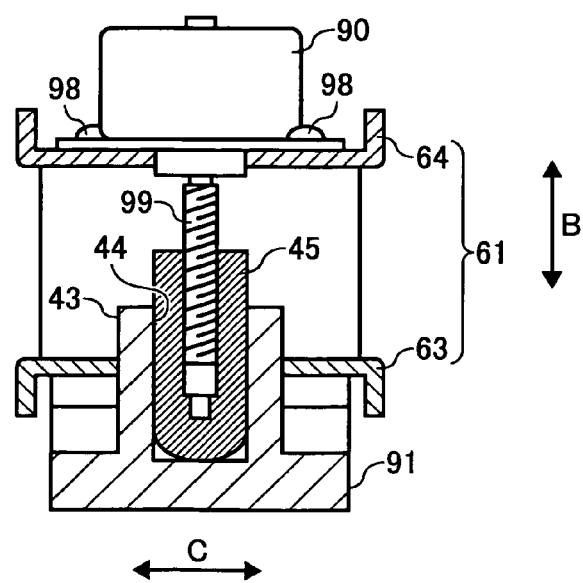
FIG. 29 is another cross section of relevant part of the scanning-line-inclination correcting unit.

A configuration example is explained of the scanning-line adjusting unit for correcting the inclination of a scanning line with reference to FIGS. 27 to 29.

The scanning-line adjusting unit uses an inclination adjusting motor disclosed in Japanese Patent Application Laid-Open No. 2004-287380. As shown in FIG. 27, the configuration thereof is such that the optical scanning device 20 includes a scanning-line-curvature correcting unit 71 that straightens the second scanning lens 30 in the sub-scanning direction B to correct curvature of the scanning line on the photosensitive drum 34 due to the beam, and a scanning-line-inclination correcting unit 72 that corrects inclination of the scanning line on the photosensitive drum 34 due to the beam by inclining the entire second scanning lens 30.

Part of the members constituting the scanning-line-curvature correcting unit 71 and a part of the members constituting the scanning-line-inclination correcting unit 72 are integrally provided on the holding member 61. The scanning-line-curvature correcting unit 71 and the scanning-line-inclination correcting unit 72 are separately arranged relative to the second scanning lens 35 as well, and a part of the members constituting these correcting units is integrally provided on the holding member 62 in the same manner as to the holding member 61.

The holding member 61 includes a support member 63 long in the main scanning direction A that supports the second scanning lens 30 from the sub-scanning direction B, and a clamp member 64 that clamps the second scanning lens 30 between the support member 63 and itself. The support member 63 includes a reference face 65 that forms a position reference of the second scanning lens 30 in the holding member 61 that abuts against the held second scanning lens 30 to form a position reference of the second scanning lens 30 in the holding member 61.

The support member 63 and the clamp member 64 are sheet metals with bending strength being increased by bending the sections thereof in a U shape, and the planes thereof are bumped against the second scanning lens 30. The plane of the support member 63 bumped against the second scanning lens 30 forms the reference face 65. A part of the second scanning lens 30 is clamped by pins 82 provided in a protruding condition on the reference face, so that the second scanning lens 30 is fixed to the support member 63 on the reference face 65.

A square pillar 66 having substantially the same height as a thickness of the second scanning lens 30 for holding a gap between the support member 63 and the clamp member 64 is arranged at opposite ends in a longitudinal direction of the support member 63 and the clamp member 64, i.e., direction A of the second scanning lens 30. The support member 63 and the square pillar 66, and the clamp member 64 and the square pillars 66 are respectively fastened by screws 67 in a state with the second scanning lens 30 being clamped by the support member 63 and the clamp member 64. The respective square pillars 66 form the holding member 61 together with the support member 63 and the clamp member 64. In FIG. 27, only the screws 67 that fasten the clamp member 64 and the square pillars 66 are depicted.

Explanations of the scanning-line-curvature correcting unit 71 are omitted herein.

As shown in FIG. 27, the scanning-line-inclination correcting unit 72 is integrally provided with the clamp member 64, and drives the holding member 61 to be inclined. The scanning-line-inclination correcting unit 72 includes a stepping motor 90, which is the actuator as a holding member-inclining unit and a drive unit, and an inclination detector (not shown) that detects inclination of the scanning line. The scanning-line-inclination correcting unit 72 also includes a central processing unit (CPU) as a controller that inclines the holding member 61 by the stepping motor 90 according to an inclination corresponding to the misregistration amount of the scanning line detected by the inclination detector to incline the entire second scanning lens 30, thereby correcting the inclination of the scanning line.

A long lens holder 91 serves as an immovable member for holding the holding member 61 integrated with the housing (not shown) of the optical scanning device 20. The immovable member can be the housing itself of the optical scanning device 20. The long lens holder 91 has a V groove 92 arranged to extend in direction C corresponding to the center of the second scanning lens 30 in direction A.

The scanning-line-inclination correcting unit 72 has a roller 93 as a fulcrum member long in direction C placed in the V groove 92. The holding member 61 is supported displaceably, specifically, swingably in such a direction that the inclination of the scanning line can be corrected by the long lens holder 91 via the roller 93. Accordingly, an abutting part between the roller 93 and the holding member 61 forms a fulcrum 47 at the time of inclining the holding member 61. The fulcrum 47 is at a central position of the second scanning lens 30 in direction A and is positioned near the optical axis of the second scanning lens 30.

When the long lens holder 91 supports the holding member 61 via only the roller 93, the holding member 61 becomes unstable. Therefore, the scanning-line-inclination correcting unit 72 has a plate spring 94 as an elastic member integrated with the support member 63 and the long lens holder 91, and a plate spring 95 as an elastic member integrated with the clamp member 64 and the long lens holder 91. The holding member 61 is then swingably supported in a direction that the inclination of the scanning line can be corrected relative to the long lens holder 91. The holding member 61 is supported by being pressed against the roller 93 due to an elastic force of the plate springs 94 and 95 so that the holding member 61 becomes stable relative to the long lens holder 91.

The plate spring 94 is integrated with the support member 63 and the long lens holder 91 by screws 96, and the plate spring 95 is integrated with the clamp member 64 and the long lens holder 91 by screws 97. As shown in FIG. 27 or 29, the stepping motor 90 is integrated with the clamp member 64 by screws 98.

As shown in FIG. 29, the stepping motor 90 has a stepping motor shaft 99. A protrusion 43 is provided in a protruding condition on an upper face of the long lens holder 91, and a nut 45 having an end in a spherical shape and a cross section in an oval shape is fitted to a groove 44 formed inside of the protrusion 43. The stepping motor shaft 99 is threaded with a male screw, and the point thereof engages with the nut 45. The nut 45 is fixed by the engagement with the groove 44, and immovable even at the time of rotation of the stepping motor shaft 99.

The CPU calculates number of steps for driving the stepping motor 90 based on the misregistration amount of the scanning line detected by the beam-spot position detectors 300a and 300b as the inclination detector, to drive the stepping motor 90. Formation of a test pattern is performed appropriately so that the test pattern is used for feedback control performed by the CPU based on the detection signal of the inclination detector.

The CPU drives the stepping motor 90 based on the detection result (relative dot misregistration in the sub-scanning direction in FIGS. 5A and 5B, i.e., correction amount $\Delta Z$ of out-of-color registration) obtained by the beam-spot position detectors 300a and 300b. When the stepping motor 90 is driven, the stepping motor shaft 99 rotates, and the holding member 61 is displaced relative to the immovable member against an energizing force of the plate springs 94 and 95. The holding member 61 gamma-rotates about the fulcrum 47 and inclines. Because the CPU performs the feedback control for driving the stepping motor 90 based on the detection result by the detector, misregistration of the scanning line, more specifically, inclination of the scanning line can be dissolved promptly.

In the optical scanning device 20, one of four colors of yellow (Y), magenta (M), cyan (C), and black (K) is designated as the reference, and the scanning position of the scanning beam by the scanning optical system of other than the reference color is corrected so that the scanning positions of other colors substantially agree with the scanning position of the reference color. That is, the scanning line by the beam corresponding to the non-reference color is made to agree with the scanning line by the beam corresponding to the reference color. This is because when correction of the relative scanning line position is performed, an image having high color reproducibility can be obtained with a change of tone being suppressed sufficiently. Accordingly, the scanning-line-curvature correcting unit 71 and the scanning-line-inclination correcting unit 72 need only to be arranged to adjust three scanning beams of those of yellow (Y), magenta (M), cyan (C), and black (K). Hence, the number of these units can only be three. The reference color can be black.

In the above embodiments, the polygon mirrors 26 and 27 deflect laser beams emitted from a plurality of light sources, separately, to scan the laser beams on different photosensitive drums. However, a polygon mirror, which is a deflector corresponding to each light source, can be used.

With the optical scanning device of the above embodiments, out-of-color registration is corrected at a slower deflection speed than that of the polygon mirror, which is the deflector at the time of writing the latent image on the surface of the photosensitive drum as an image carrier. Accordingly, the downtime required to correct out-of-color registration can be reduced compared with a conventional optical scanning device that corrects out-of-color registration after the deflection speed reaches the speed at the time of writing the latent image on the surface of the photosensitive drum. Moreover, the correction of out-of-color registration can be performed with low energy and low noise.

A deviation in the sub-scanning direction of the scanning beam is corrected based on the average of the correction amount $\Delta Z$ calculated based on the detection result of the beam-spot position detector 300a that detects the scanning start position and the correction amount $\Delta Z$ calculated based on the detection result of the beam-spot position detector 300b that detects the scanning end position. Accordingly, out-of-color registration due to inclination can be reduced as compared with a case that out-of-color registration is corrected based on the correction amount $\Delta Z$ of out-of-color registration calculated based on the detection result obtained by either one of the beam-spot position detectors 300a and 300b.

The correction amount $\Delta Z$ of out-of-color registration is calculated based on the detection results of the respective beam-spot position detectors 300a and 300b provided in two positions in the main scanning direction. The inclination amount of the scanning beam is obtained based on a difference between these correction amounts $\Delta Z$ of out-of-color registration and a distance between the beam detectors. The inclination of the scanning beam is corrected based on the obtained inclination amount. Thus, a deviation between the scanning beam and the set position can be reduced further, and out-of-color registration can be further reduced by correcting the inclination of the scanning beam.

As shown in FIG. 5A, the beam-spot position detectors 300a and 300b have a first photodetector PD1 in which at least a light receiving surface is perpendicular to the scanning direction of the scanning beam and a second photodetector PD2 in which the light receiving surface is inclined relative to the light receiving surface of the photodetector PD1, on the scanning line of the scanning beam. The position of the scanning beam in the sub-scanning direction can be detected by measuring the time until the scanning beam scans between the first photodetector PD1 and the second photodetector PD2. This is because the light receiving surface of the second photodetector PD2 is inclined relative to the light receiving surface of the first photodetector PD1, the time required for the scanning beam to pass through between the first photodiode PD1 and the second photodetector PD2 is different at respective positions in the sub-scanning direction. Accordingly, the position of the scanning beam in the sub-scanning direction can be detected by measuring the time.

The correction amount $\Delta Z$ of out-of-color registration is calculated based on time difference (T1−T2) between time T1 required for the scanning beam L1 at the set position stored in the memory to scan between the first photodetector PD1 and the second photodetector PD2 and time T2 required for the scanning beam at the time of the correction of out-of-color registration to scan between the first photodetector PD1 and the second photodetector PD2. As described above, because the time required for scanning between the first photodetector PD1 and the second photodetector PD2 corresponds to the position of the scanning beam in the sub-scanning direction, a deviation amount, i.e., an amount of out-of-color registration from the set position can be obtained from the time difference with times T1 and T2. Accordingly, by displacing an irradiation position of the scanning beam based on the deviation amount, out-of-color registration can be corrected.

The scanning speed of the scanning beam L1 at the set position is different from the scanning speed of the scanning beam L2 at the time of the correction of out-of-color registration, and when the speed of at least one of the scanning beams is unclear, an accurate deviation amount cannot be calculated from the time T2 and time T1.

In this case, as shown in FIG. 5B, the beam-spot position detector is used, which is provided with a third photodetector with the light receiving surface being parallel to either one of the light receiving surfaces of the first photodetector PD1 and the second photodetector PD2. Time T3' required for the scanning beam to pass from the photodetector having the light receiving surface parallel to the light receiving surface of the third photodetector PD3 to the third photodetector PD3 is measured together with time T2 required for scanning between the first photodetector PD1 and the second photodetector PD2. Time T2 is corrected based on the ratio between time T3 required for the scanning beam L1 at the set position to pass from the photodetector having the light receiving surface parallel to the light receiving surface of the third photodetector PD3 to the third photodetector PD3 and time T3'. The correction amount $\Delta Z$ of out-of-color registration is calculated based on the difference between the corrected time T2 and time T1.

The distance from the photodetector having the light receiving surface parallel to that of the third photodetector PD3 and the third photodetector PD3 does not change in the sub-scanning direction. Accordingly, a ratio between the scanning speed of the scanning beam L1 at the set position and the scanning speed of the scanning beam L2 at the time of the correction can be expressed by a ratio between times T3 and T3'. As a result, time T2 measured at the time of the correction can be corrected to the time required for the scanning beam L2 to pass from the first photodetector PD1 to the second photodetector PD2 at the scanning speed of the scanning beam L1 by correcting time T2 measured by the ratio between times T3 and T3'. Accordingly, the accurate deviation amount can be calculated from the difference between time T2 corrected by the ratio between times T3 and T3' and time T1.

The correction amount $\Delta Z$ of out-of-color registration is respectively calculated for the scanning beams of the multiple of the number of faces of the polygon mirror, and out-of-color registration is corrected based on the average of these correction amounts $\Delta Z$ of out-of-color registration. Accordingly, a difference in the correction amounts $\Delta Z$ of out-of-color registration due to the face tangle error of the polygon mirror can be suppressed, thereby excellently suppressing out-of-color registration.

According to the first embodiment, out-of-color registration is corrected after the polygon mirror starts rotation at the time of writing the latent image on the surface of the photosensitive drum as image carriers, until the deflection speed (rotation speed) of the polygon mirror reaches the deflection speed at the time of writing the latent image on the surface of the photosensitive drum. Accordingly, the time after it is instructed to write the latent image on the surface of the photosensitive drum until the latent image is written on the surface of the photosensitive drum can be reduced as compared with a conventional apparatus that corrects out-of-color registration after the deflection speed (rotation speed) of the polygon mirror reaches the deflection speed at the time of writing the latent image on the surface of the photosensitive drum. Further, because out-of-color registration is corrected before writing the latent image, an excellent image having no out-of-color registration can be obtained.

According to the second embodiment, out-of-color registration is corrected after writing onto the photosensitive drum is completed until the rotation of the polygon mirror stops. Even when writing of the latent image on the surface of the photosensitive drum is completed and the drive voltage applied to the polygon motor is turned off, the polygon mirror continues to rotate due to inertia. In the second embodiment, out-of-color registration is corrected after writing of the latent image on the surface of the photosensitive drum is completed and while the polygon mirror still rotates due to inertia. Accordingly, out-of-color registration can be corrected in the energy saving mode.

According to the fourth embodiment, out-of-color registration can be corrected at least when the apparatus is turned on or when the apparatus wakes up from power saving mode, in which there is a high possibility that the environment can be greatly different from that at the time of performing the last correction. As described above, out-of-color registration can also be corrected when a predetermined time has passed after previous correction of out-of-color registration.

According to the fourth embodiment, the rotation speed of the polygon mirror at the time of performing the correction of out-of-color registration is set to 50% or more to 80% or less of the rotation speed at the time of writing the latent image on the surface of the photosensitive drum. Accordingly, the polygon motor can achieve constant rotation more quickly than a conventional apparatus that corrects out-of-color registration with the number of revolutions for forming an image, thereby reducing the time required for correcting out-of-color registration. Because out-of-color registration is corrected with the number of revolutions less than that for forming an image, the drive voltage applied to the polygon motor can be suppressed, and correction of out-of-color registration can be performed in the energy saving mode. Furthermore, because the rotation speed of the polygon motor is suppressed, vibrations of the motor can be reduced, thereby enabling correction of out-of-color registration with low noise.

According to the fourth embodiment, the emission amount of the light-emitting diode LD at the time of correcting out-of-color registration is reduced to 50 to 80% of that at the time of forming an image, and therefore correction of out-of-color registration can be performed in the better energy saving mode.

According to the modified example of the fourth embodiment, lock detection by the lock detector that detects whether the deflection speed (rotation speed) of the polygon mirror is the deflection speed (rotation speed) thereof at the time of writing the latent image on the surface of the photosensitive drum is prohibited. Because the lock signal, which is issued when the polygon motor rotates at a constant speed equivalent to the set speed, is not detected even after the predetermined time has passed, it can be suppressed that abnormality such as a failure of the apparatus is wrongly determined.

According to the fourth embodiment, out-of-color registration is corrected by setting the frequency calculated by multiplying the number of revolutions per second of the polygon mirror by the number of mirrors to equal to less than 10 kilohertz. Accordingly, the frequency of the rushing sound generated due to the rotation of the polygon mirror can be set to high-sensitivity frequency or less relative to the human auditory characteristic. Accordingly, the user will not be bothered by the noise generated at the time of the correction of out-of-color registration.

During correction of out-of-color registration, the light-emitting diode LD as a light emitting unit emits light beams all the time. Accordingly, the scanning beam can be reliably irradiated to the beam-spot position detector even in a state where the deflection speed is not constant, and the position of the scanning beam in the sub-scanning direction can be reliably detected.

The shutter mechanism that blocks the scanning beam is provided between the beam-spot position detector and the photosensitive drum, and the shutter is closed to block the scanning beam while out-of-color registration is being corrected. Therefore, the scanning beam is not irradiated onto the photosensitive drum at the time of correcting out-of-color registration. Accordingly, deterioration of the photosensitive drum due to the scanning beam can be suppressed.

According to the third embodiment, correction of out-of-color registration can be performed when the deflection speed of the polygon mirror becomes equal to or less than that of at the time of writing the latent image on the photosensitive drum, during a period until the next image formation is started in the continuous image forming operations. In this case, out-of-color registration is corrected by using a state where the rotation speed of the polygon motor is low to start the next image formation. Accordingly, the energy can be effectively used, as compared to an apparatus that rotates the polygon motor.

According to an embodiment of the present invention, out-of-color registration can be corrected at earlier timing as compared with a conventional apparatus that corrects out-of-color registration after the deflection speed of its image carrier reaches the deflection speed for writing a latent image on the surface thereof. Accordingly, the downtime required to correct out-of-color registration can be reduced as compared with the conventional apparatus.

Moreover, because the deflection speed is slow, the power to be supplied to the drive motor that drives the deflector can be reduced. Thus, the correction of out-of-color registration can be performed with low energy.

Furthermore, because the deflection speed is slow, vibrations or the like of the drive motor that drives the deflector can be reduced. Thus, out-of-color registration can be corrected with low noise.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that is configured to be installed in an image forming apparatus, the optical scanning device comprising:
    a light emitting unit that emits a light beam;
    a deflector that deflects and scans the light beam in a main scanning direction on a surface of an image carrier;
    a plurality of folding mirrors that reflect light from the light emitting unit;
    a beam detector, that is a spot detector, arranged between a folding mirror closest to the image carrier and the image carrier, the beam reflector being configured to detect a beam position of the light beam deflected by the deflector in a sub-scanning direction;
    a correcting unit that calculates a correction amount of out-of-color registration based on the beam position, and shifts the beam position to a specified position on the surface of the image carrier based on the correction amount to correct out-of-color registration in the sub-scanning direction prior to irradiation of the image carrier; and
    a controller that controls, while the beam detector detects the beam position for correction of out-of-color registration, a deflection speed of the deflector to be less than a writing deflection speed for writing a latent image on the surface of the image carrier, wherein
    the correcting unit corrects out-of-color registration in a period after the deflector is activated and before the deflection speed reaches the writing deflection speed to write a latent image on the surface of the image carrier.

2. The optical scanning device according to claim 1, wherein the beam detector includes
    a first beam detector that detects a scan start position of the light beam; and
    a second beam detector that detects a scan end position of the light beam,
    the correcting unit calculates correction amounts of out-of-color registration based on the scan start position and the scan end position, and corrects a deviation of the light beam in the sub-scanning direction based on an average of the correction amounts.

3. The optical scanning device according to claim 1, wherein
    the beam detector includes a plurality of beam detectors at two positions in the main scanning direction, and
    the correcting unit calculates correction amounts of out-of-color registration based on detection results obtained by the beam detectors, detects an inclination amount of the light beam based on a difference between the correction amounts and a distance between the beam detectors, and corrects inclination of the light beam based on the inclination amount.

4. The optical scanning device according to claim 1, wherein the beam detector includes
a first photodetector having a first light receiving surface perpendicular to a scanning direction of the light beam;
a second photodetector having a second light receiving surface inclined relative to the first light receiving surface, the first photodetector and the second photodetector being located on a scanning line of the light beam, and
a measuring unit that measures time T1 required for the light beam to scan between the first photodetector and the second photodetector.

5. The optical scanning device according to claim 4, further comprising a memory that stores therein time T1 required for the light beam at the specified position to scan between the first photodetector and the second photodetector and the time T2, and
the correcting unit calculates the correction amount based on a difference between the time T1 and the time T2.

6. The optical scanning device according to claim 5, wherein
the beam detector further includes a third photodetector having a third light receiving surface parallel to any one of the first light receiving surface and the second light receiving surface,
the measuring unit measures time T3 required for the light beam to pass from one of the first photodetector and the second photodetector whose light receiving surface is parallel to the third light receiving surface to the third photodetector, and
the correcting unit corrects the time T2 based on a ratio between the time T3' and time T3 required for the light beam at the specified position to pass from one of the first photodetector and the second photodetector whose light receiving surface is parallel to the third light receiving surface to the third photodetector, and calculates the correction amount based on the time T1 and corrected time T2.

7. The optical scanning device according to claim 1, wherein
the deflector is a rotary polygon mirror, and
the correcting unit calculates correction amounts of out-of-color registration for light beams in a number corresponding to a multiple of number of reflecting surfaces of the polygon mirror, and corrects out-of color registration based an average of the correction amounts.

8. The optical scanning device according to claim 1, wherein the correcting unit corrects out-of color registration in a period after a latent image is written on the surface of the image carrier until the deflector stops.

9. The optical scanning device according to claim 1, wherein the correcting unit corrects out-of color registration at least one of when the image forming apparatus is turned on and when the image forming apparatus wakes up from power saving mode.

10. The optical scanning device according to claim 1, wherein the correcting unit corrects out-of color registration when a predetermined time has passed after previous correction of out-of color registration.

11. The optical scanning device according to claim 10, wherein
the deflector is a rotary polygon mirror, and
the controller controls, while the correcting unit corrects out-of color registration, a rotation speed of the polygon mirror to be not less than 50 percent and not more than 80 percent of a rotation speed for writing a latent image on the surface of the image carrier.

12. The optical scanning device according to claim 11, wherein, while the correcting unit corrects out-of-color registration, the light emitting unit emits the light beam in an amount not less than 50 percent and not more than 80 percent of an amount for writing a latent image on the surface of the image carrier.

13. The optical scanning device according to claim 10, further comprising a lock detector that detects whether the deflection speed of the deflector is the writing deflection speed, and is prevented from performing detection while the correcting unit corrects out-of color registration.

14. The optical scanning device according to claim 10, wherein
the deflector is a rotary polygon mirror, and
the correcting unit corrects out-of-color registration by setting a frequency obtained by multiplying number of revolutions of the polygon mirror per second by number of reflecting surfaces of the polygon mirror to equal to or less than 10 kilohertz.

15. The optical scanning device according to claim 1, wherein the light emitting unit constantly emits the light beam while the correcting unit corrects out-of-color registration.

16. The optical scanning device according to claim 15, further comprising a shutter mechanism that blocks the light beam between the beam detector and the image carrier while the correcting unit corrects out-of-color registration.

17. An image forming apparatus comprising an optical scanning device that includes
a light emitting unit that emits a light beam;
a deflector that deflects and scans the light beam in a main scanning direction on a surface of an image carrier;
a plurality of folding mirrors that reflect light from the light emitting unit;
a beam detector arranged between a folding mirror closest to the image carrier and the image carrier that detects a beam position of the light beam deflected by the deflector in a sub-scanning direction;
a correcting unit that calculates a correction amount of out-of-color registration based on the beam position, and shifts the beam position to a specified position on the surface of the image carrier based on the correction amount to correct out-of-color registration in the sub-scanning direction prior to irradiation of the image carrier; and
a controller that controls, while the beam detector detects the beam position for correction of out-of color registration, a deflection speed of the deflector to be less than a writing deflection speed for writing a latent image on the surface of the image carrier.

18. The image forming apparatus according to claim 17, wherein, upon successive image formation, the correcting unit corrects out-of-color registration when the deflection speed becomes equal to or less than the writing deflection speed during a period until start of next image formation.

* * * * *